US005646754A

United States Patent [19]
Takeda et al.

[11] Patent Number: 5,646,754
[45] Date of Patent: Jul. 8, 1997

[54] FERROELECTRIC LIQUID CRYSTAL DISPLAY DEVICE INCLUDING A FERROELECTRIC LIQUID CRYSTAL MATERIAL CAPABLE OF EXHIBITING THE SMECTIC A PHASE AND THE CHIRAL SMECTIC C PHASE

[75] Inventors: Hitoshi Takeda; Masami Kido; Takashi Kaneko; Mitsuhiro Koden, all of Kashiwa, Japan

[73] Assignee: Sharp Kabushiki Kaisha, Osaka, Japan

[21] Appl. No.: 536,145

[22] Filed: Sep. 29, 1995

[30] Foreign Application Priority Data

Sep. 30, 1994 [JP] Japan .................................. 6-237851

[51] Int. Cl.⁶ ............................................. G02F 1/1343
[52] U.S. Cl. .................................................. 349/172
[58] Field of Search ................................... 359/100, 56

[56] References Cited

U.S. PATENT DOCUMENTS 5,404,237  4/1995  Katsuse, et al. ........................ 359/100
5,481,387  1/1996  Hanyu et al. ........................... 359/100

FOREIGN PATENT DOCUMENTS 1-158415   6/1989  Japan .
2-165120   6/1990  Japan .
3-252624  11/1991  Japan .

OTHER PUBLICATIONS

N.A. Clark et al., *Applied Physics Letter*, vol. 36, No. 11, pp. 899–901, 1980, "Submicrosecond bistable electro–optic switching in liquid crystals".
J. Kanbe et al, *Ferroelectrics*, vol. 114, pp. 3–26, 1991, "High Resolution, Large Area FLC Display eith High Graphic Performance".
M. Koden, et al., *Japanese Journal of Applied Physics*, vol. 30, No. 10B, pp. L1823–L1825, 1991, "The States of Surface–Stabilized Ferroelectric Liquid Crystal with High–Pretilt Aligning Film".
A. Tagawa et al., *Japan Display* '92, pp. 519–522, 1992, "P2–23 Four States of Surface Stabilized Ferroelectric Liquid Crystal with Parallel Rubbing ".
P.W.H. Surguy et al., *Ferroelectrics*, vol. 122, pp. 63–79, 1991, "The Joers/Alvey" Ferroelectric Multiplexing Scheme.
P.W. Ross et al., *SID 92 DIGEST*, pp. 217–220, 1992, "13.1: Color Digital Ferroelectric LCDs for Laptop Applications".
J. C. Jones et al. *Ferroelectrics*, vol. 121, pp. 91–102, 1991, "The Importance of Dielectric Biaxiality for Ferroelectric Liquid Crystal Devices".
J.R. Hughes et al, WO 92/02925, published on Feb. 29, 1992.
J.R. Hughes et al, *Liquid Crystals*, vol. 13, No. 4, pp. 597–601, 1993, "A new set of High Speed Matrix Addressing Schemes for Ferroelectric Liquid Crystal Displays".
K. Suzuki et al., *Applied Physics Letter*, vol. 33, No. 7, pp. 561–563, 1978, "A Method of Measuring the Low Tilt Bias Angle of Liquid Crystals".
M. Koden et al., *Japanese Journal of Applied Physics*, vol. 31, No. 11, Part 1, Nov. 1992, Tokyo, Japan, pp. 3632–3635.
*The Fourth International Conference on Ferroelectric Liquid Crystals*, Tokyo, Japan, Sep. 28–Oct. 1, 1993, vol. 149, No. 1–4, pp. 193–194, ISSN 0015-0193.

*Primary Examiner*—William L. Sikes
*Assistant Examiner*—James A. Dudek
*Attorney, Agent, or Firm*—David G. Conlin; Brian L. Michaelis

[57] ABSTRACT

A ferroelectric liquid crystal device includes: a pair of insulating substrates having alignment films and electrodes thereon; and a liquid crystal layer interposed between the pair of insulating substrates, the liquid crystal layer including a ferroelectric liquid crystal material being capable of exhibiting at least the smectic A phase and the chiral smectic C phase in its phase sequence, and the ferroelectric liquid crystal device being driven by switching an optic axis of the liquid crystal layer by selectively applying a driving voltage to at least one of the electrodes, wherein ferroelectric liquid crystal molecules of the liquid crystal layer have a tilt angle of 8° or less at a (Tc−1)°C. where Tc°C. is an uppermost temperature limit of the chiral smectic C phase of the ferroelectric liquid crystal material.

7 Claims, 18 Drawing Sheets

FIG. 2
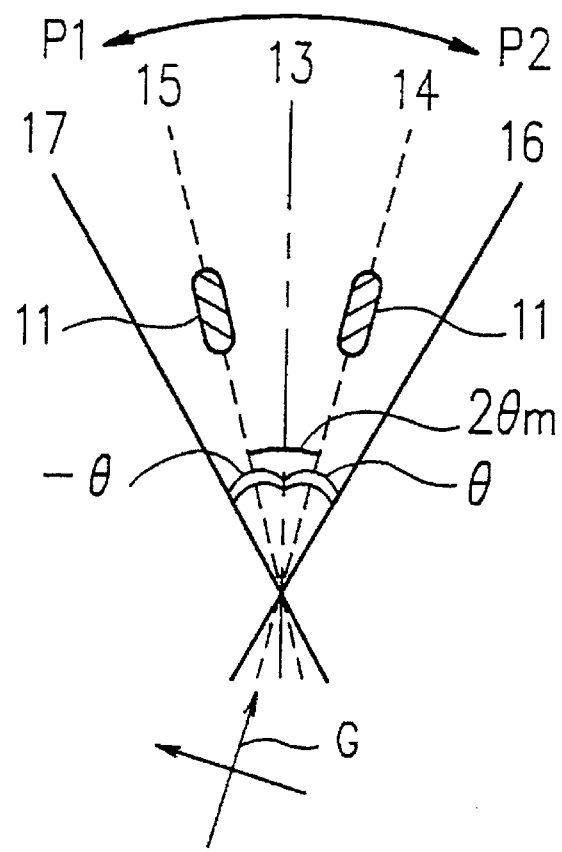
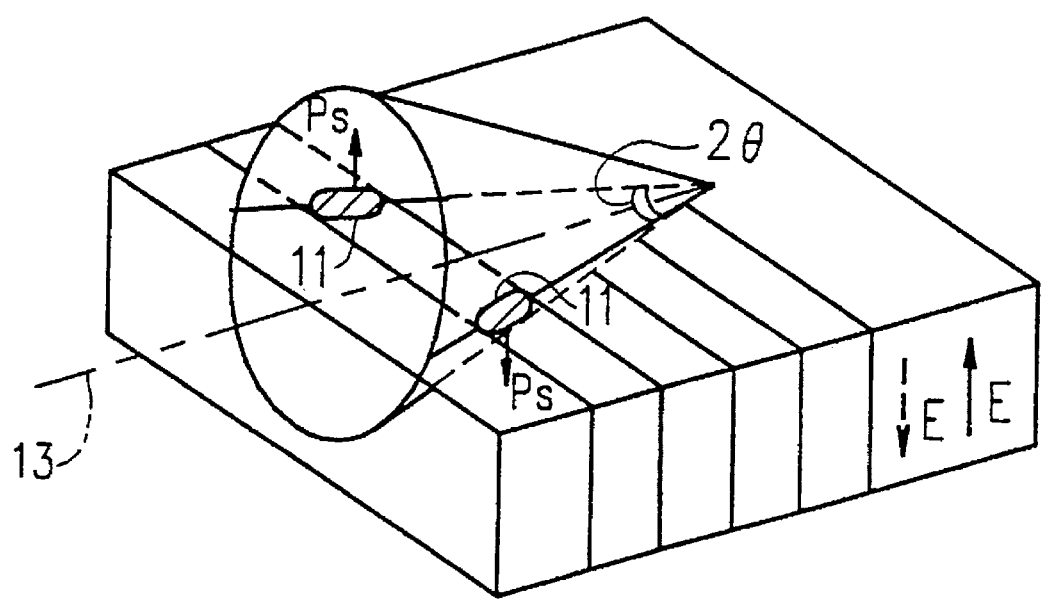

Driving waveform (A)

FIG. 7
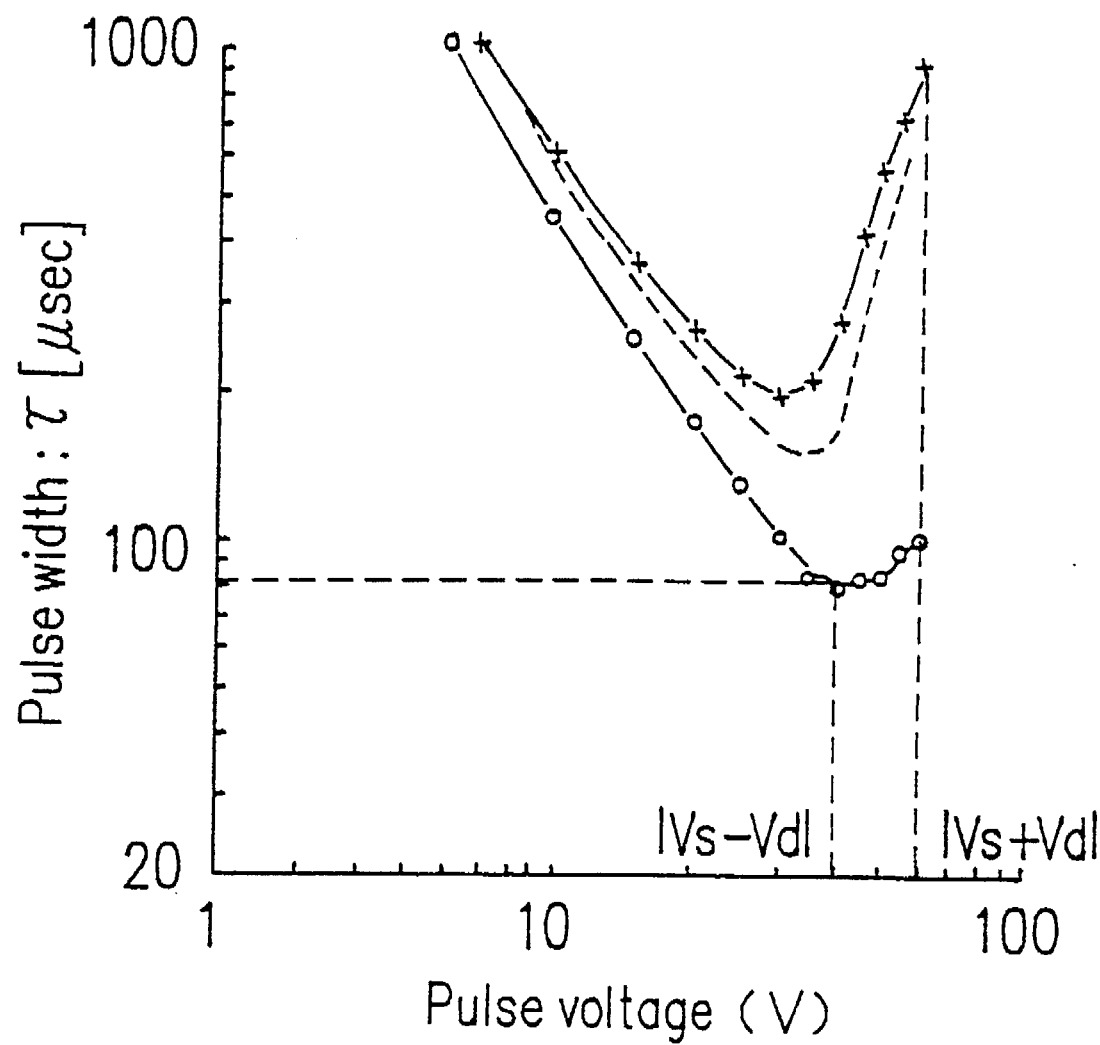
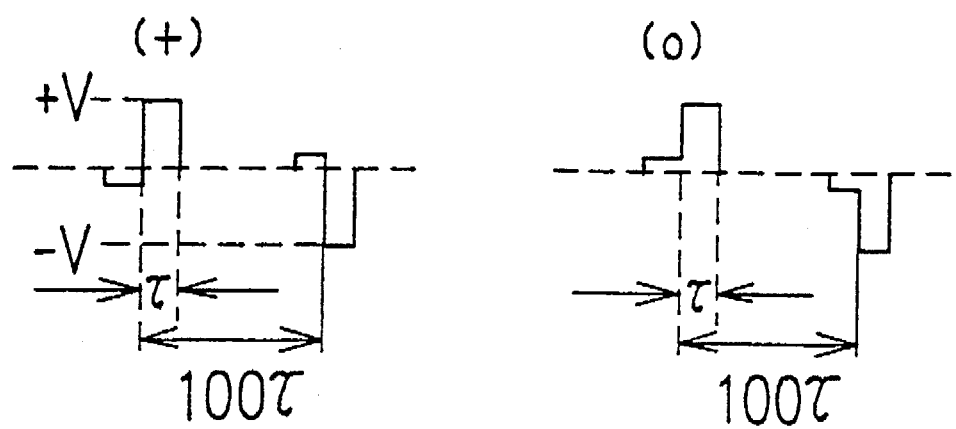

Driving waveform (B)

Driving waveform (C)

FIG. 26
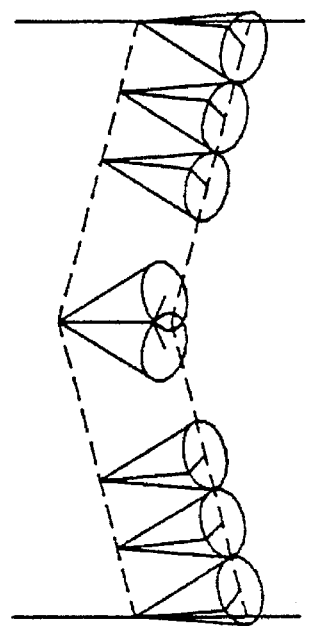
C1U
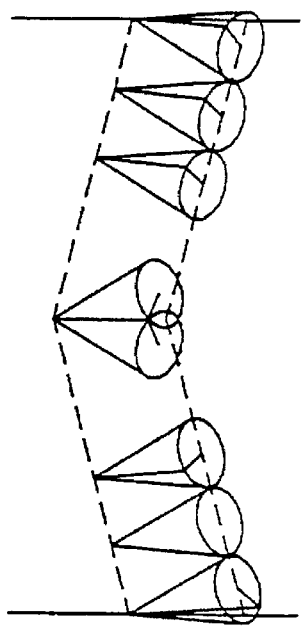
C1T
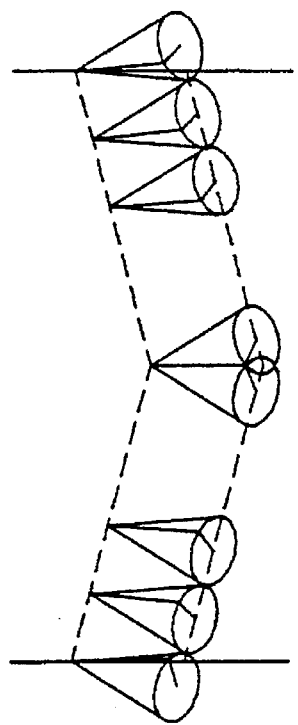
C2U
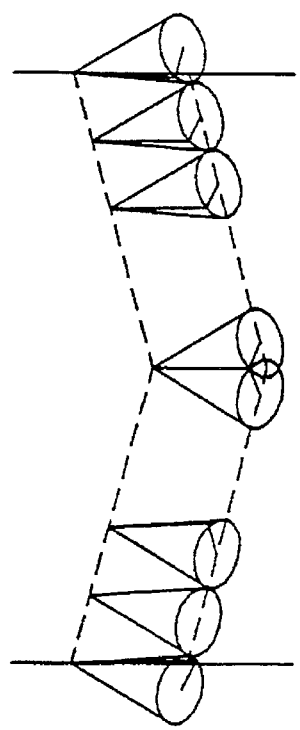
C2T

FERROELECTRIC LIQUID CRYSTAL DISPLAY DEVICE INCLUDING A FERROELECTRIC LIQUID CRYSTAL MATERIAL CAPABLE OF EXHIBITING THE SMECTIC A PHASE AND THE CHIRAL SMECTIC C PHASE

BACKGROUND OF THE INVENTION

1. Field of the Invention

The present invention relates to a ferroelectric liquid crystal device to be used for a liquid crystal display apparatus or a printer head. (Hereinafter, liquid crystal will be referred to as "LC"; ferroelectric liquid crystal will be referred to as "FLC"; and ferroelectric liquid crystal devices will be referred to as "FLCDs".)

2. Description of the Related Art

In recent years, LC display apparatuses of various display modes utilizing a LC material in the smectic phase have been vigorously studied in addition to LC display apparatuses utilizing a LC material in the nematic phase. Among display apparatuses incorporating LC display devices utilizing a LC material in the smectic phase, a display apparatus utilizing a surface-stabilized ferroelectric LC device (hereinafter referred to as SSFLCD) is considered particularly promising. Such a display apparatus is disclosed in literature by N. A. Clark, et al., Appl. Phys. Lett., 36, 899 (1980), for example.

An SSFLCD is known to have two orientation states: a uniform state, which exhibits some extinction positions; and a twisted state, which exhibits no extinction positions.

As shown in FIG. 25, a FLC layer 52 of an SSFLCD 50 has smectic layers 54, which are bent as shown in the figure. Such a structure is called a chevron layer structure. FLC molecules in the chevron layer structure take two orientation states, namely, C1 and C2 states, and one FLC layer may include regions of the C1 state and regions of the C2 state, as described in literature by J. Kanbe et al., Ferroelectrics, 114, 3 (1991). In the C1 state, the smectic layers 54 are bent or project in a direction (indicated by arrow L1) which is opposite to the direction (indicated by arrows R1 and R2) of a uniaxial orientation treatment that is performed for the alignment films of the device. In the C2 state, the smectic layers 54 are bent or project in a direction (indicated by arrow L2) which is identical with the direction (indicated by arrows R1 and R2) of the uniaxial orientation treatment for the alignment films. If regions of the C1 state and regions of the C2 state are both present in the same device, there may be a hairpin defect 56 or a lightning defect 58 in the interfaces of these regions. Reference numeral ∂p represents a pretilt angle. The direction of pretilt depends on the direction of a uniaxial orientation treatment, e.g., a rubbing treatment.

Furthermore, FLC molecules of the chevron structure are known to take the four orientation states shown in FIG. 26, namely, a C1U (i.e., "C1 Uniform") state, a C1T ( i.e., "C1 Twisted") state, a C2U ( i.e., "C2 Uniform") state, and a C2T (i.e., "C2 Twisted") state.

Koden et al., who are the inventors of the present invention, report in M. Koden et al., Jpn. J. Appl. Phys., 30, L1823 (1991) that they obtained a FLC cell with parallel-rubbed high-pretilt alignment films in which three orientation states, i.e., the C1U state, the C1T state, and the C2 state were all present.

On the other hand, Tagawa et al. report in A. Tagawa et al., Japan Display '92, 519 (1992) that they obtained a FLC cell with parallel-rubbed alignment films having a pretilt angle of 5° or less in which four orientation states, i.e., the C1U state, the C1T state, the C2U state, and the C2T state were all present.

In general, the driving characteristics of a FLCD depends on the orientation state of the FLC molecules. Therefore it is preferable for the entire LC layer to have a uniform orientation. Furthermore, if the C1 state and the C2 state are both present as in the case of conventional FLCDs, there may be hairpin defects or lightning defects occurring in the interfaces of the C1 and C2 regions, thereby leading to insufficient display or reduction in contrast. Therefore, it is preferable for the entire device to have a uniform orientation. The more preferable orientation state of the LC molecules is the C2U state, as opposed to the C1U and C1T states, in terms of such factors as the driving voltage, response speed, and extinction characteristic.

The present inventors have found that a FLCD of the C2T state can also attain excellent driving characteristics and contrast, as do FLCDs of the C2U state, by using a driving method such as that reported by Surguy et al. (P. W. H. Surguy et al., Ferroelectrics, 122, 63(1991)) called THE "JOERS/ALVEY" FERROELECTRIC MULTIPLEXING SCHEME.

However, methods for selectively obtaining the C2 state over the entire LC layer (or the entire device) have not been studied in detail.

SUMMARY OF THE INVENTION

The ferroelectric liquid crystal device of the present invention includes: a pair of insulating substrates having alignment films and electrodes thereon; and a liquid crystal layer interposed between the pair of insulating substrates, the liquid crystal layer including a ferroelectric liquid crystal material being capable of exhibiting at least the smectic A phase and the chiral smectic C phase in its phase sequence, and the ferroelectric liquid crystal device being driven by switching an optic axis of the liquid crystal layer by selectively applying a driving voltage to at least one of the electrodes, wherein ferroelectric liquid crystal molecules of the liquid crystal layer have a tilt angle of 8° or less at a (Tc−1)°C. where Tc°C. is an uppermost temperature limit of the chiral smectic C phase of the ferroelectric liquid crystal material.

In one embodiment of the present invention, the liquid crystal layer has a bent smectic layer structure, and a uniaxial orientation treatment is conducted for the alignment films in a direction identical with a bend direction of the smectic layer structure.

In another embodiment of the present invention, ferroelectric liquid crystal molecules of the liquid crystal layer have two stable states for switching the optic axis of the liquid crystal layer, and a characteristic curve of pulse widths and pulse voltages required for rewriting the liquid crystal layer from one stable state to the other stable state has a pulse voltage which corresponds to a minimal value of the pulse width.

In still another embodiment of the present invention, the electrodes are a plurality of scanning electrodes and a plurality of signal electrodes which cross the plurality of scanning electrodes, and a plurality of pixels are defined by crossed regions of the plurality of scanning electrodes and the plurality of signal electrodes, wherein the ferroelectric liquid crystal device is driven by using voltages $V_1$, $V_2$, $V_3$, and $V_4$ which satisfy the relationships:

$0 < V_2 < V_4;$ and $V_2 - V_1 < V_4 - V_3,$ so that:

A) when one of the plurality of pixels is selected, the ferroelectric liquid crystal molecules in a portion of the selected pixel are placed in one or the other stable state by applying a first pulse voltage $V_1$ followed by a second pulse voltage $V_2$ or applying a first pulse voltage $-V_1$ followed by a second pulse voltage $-V_2$ to the pixel; and B) the stable state of the ferroelectric liquid crystal molecules in the portion of the selected pixel is maintained by applying a first pulse voltage $V_3$ followed by a second pulse voltage $V_4$ or applying a first pulse voltage $-V_3$ followed by a second pulse voltage $-V_4$ to the pixel.

Thus, the invention described herein makes possible the advantage of providing a FLCD having the C2 state over the entire LC layer, thereby achieving uniform electro-optical characteristics.

These and other advantages of the present invention will become apparent to those skilled in the art upon reading and understanding the following detailed description with reference to the accompanying figures.

BRIEF DESCRIPTION OF THE DRAWINGS

FIG. 2 is a schematic diagram showing the state of FLC molecules in the chiral smectic C phase.

FIG. 7 is a view describing a principle of the driving method shown in FIG. 6.

FIG. 26 consists of four diagrams showing model LC molecule orientations in the C1U state, the C1T state, the C2U state, and the C2T state, respectively.

DESCRIPTION OF THE PREFERRED EMBODIMENTS

In general, the orientation structure of the FLC molecules in a FLCD is formed when the FLC material is cooled down from a temperature at which it exhibits the isotropic liquid phase or the nematic phase. The present inventors found the fact that the orientation state of FLC molecules is determined hinging on a temperature range from an uppermost temperature limit Tc of the chiral smectic C phase to a temperature several degrees (° C.) lower than that temperature during the above cooling process. As a result of an examination of the physical characteristics of FLC material in this temperature range, the present inventors have found an effective method for obtaining a FLCD having the C2 state over the entire LC layer.

Figure 1:
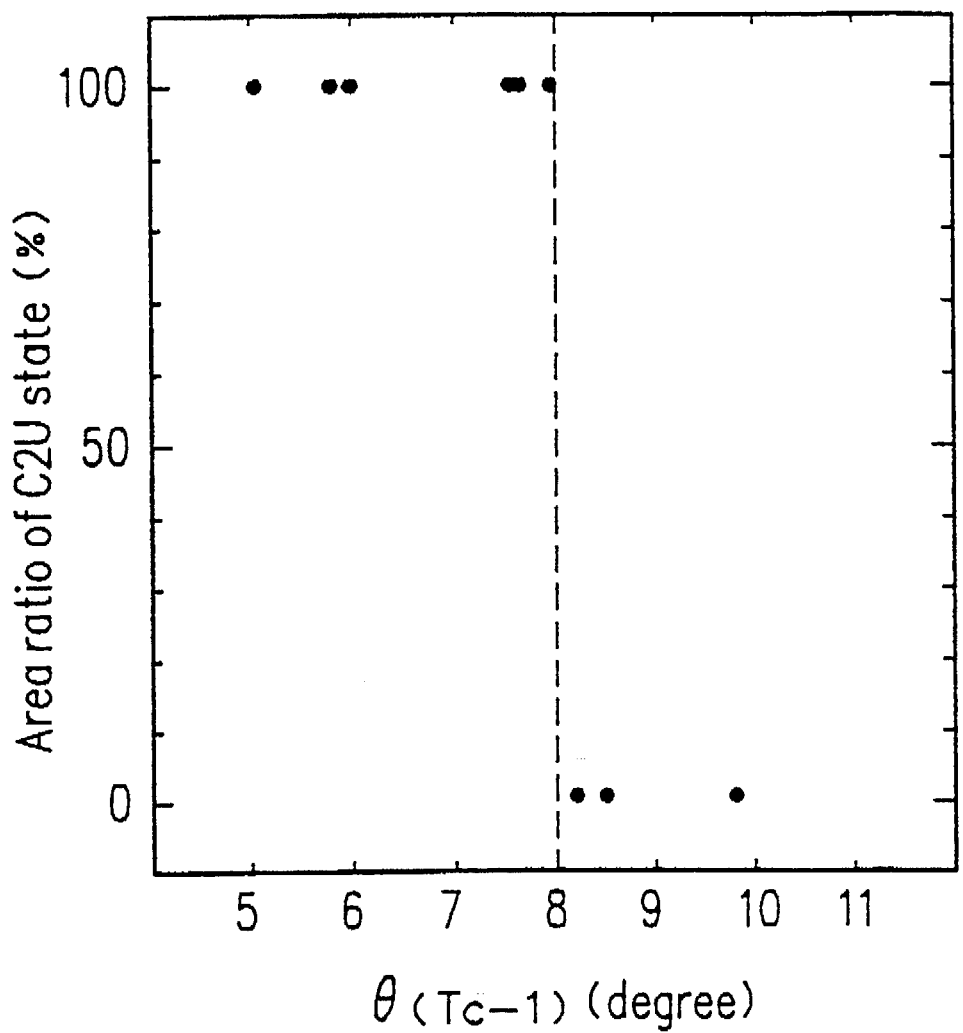
FIG. 1 is a graph showing the relationship between the orientation state and the tilt angle of a FLCD according to the present invention.

FIG. 1 shows the relationship between: the tilt angle θ (Tc–1) of FLC molecules at (Tc–1)°C.; and an area ratio of C2 state regions to the entire LC layer in percentage. As seen from FIG. 1, the area ratio of the C2 state regions is 100% when the tilt angle of the FLC molecules is 8° or less, indicating that the entire LC layer uniformly has the C2 state.

A FLC material to be used for the FLCD according to the present invention is capable of taking the following phases: the chiral nematic phase (N*), the smectic A phase ($S_A$), and the chiral smectic C phase (Sc*). It should at least take the smectic A phase ($S_A$) and the chiral smectic C phase. Moreover, the FLC molecules of the material have a tilt angle of 8° or less at a (Tc–1)°C. (where Tc°C. is the uppermost temperature limit of the chiral smectic C phase). Thus, the C2 state is obtained over the entire LC layer.

The reason for the C2 state predominating over the entire LC layer is considered as follows:

When a FLC layer is cooled down from the uppermost temperature limit Tc of the chiral smectic C phase, the C1 state becomes stable first, and when the FLC layer is further cooled, the C2 state becomes stable. However, if the smectic layers have an excessively large bend in the C1 state, little transition from the C1 state to the C2 state (where the smectic layers have the opposite bend) happens even when the FLC layer is cooled to a temperature at which the C2 state becomes stable. The bend angle of the smectic layers and the tilt angle are correlated with each other; by using a FLC material having a tilt angle of 8° or less at (Tc−1)°C., the bend angle of the smectic layers at the temperature where the C2 state becomes more stable than the C1 is sufficiently small to allow the reversal of the bend direction. As a result, the C1 state can easily shift to the C2 state.

The reason for adopting the temperature (Tc−1)°C. as a reference value is totally arbitrary. The adoption of temperatures (Tc−1.5)°C., (Tc−2)°C., etc. will result in correspondingly different tilt angle values, but the condition that "the tilt angle should be 8° or less at (Tc−1)°C." certainly exists.

In the present specification, the uppermost temperature limit Tc°C. is defined as the highest possible temperature for the chiral smectic C phase to exist. Accordingly, in the case where both the chiral smectic C phase and the smectic A phase can exist at the same time during a transition from the chiral smectic C phase to the smectic A phase, Tc°C. is defined as the temperature at which the co-existence of the chiral smectic C phase and the smectic A phase shifts to the sole existence of the smectic A phase, i.e., the highest possible temperature for the two phases to coexist.

Next, the tilt angle will be described with reference to FIG. 2. FIG. 2 is a schematic diagram showing the orientation state of FLC molecules 11 in the chiral smectic C phase. When a positive or negative electric field E of a sufficient strength is applied to the FLC material in the state shown in FIG. 2, the FLC molecules 11 take one of two stable states (bistable state) 16 and 17 which are located symmetrically with respect to a normal axis 13 to the smectic layer. The switching between the two stable orientation states depends on the polarity (P1 or P2) of the electric field E with respect to the direction of the spontaneous polarization Ps of the FLC molecules. The tilt angle is defined as the absolute value $\theta$ of the angle of the longitudinal axis direction of the FLC molecules 11 in the stable state 16 or 17 with respect to the normal axis 13 to the smectic layer. The tilt angle $\theta$ is a physical characteristic value inherent to the FLC material which is dependent on the temperature. On the other hand, an angle $2\theta$ m between the longitudinal axes of the FLC molecules 11 in memory states 14 and 15 when driving the FLCD is a characteristic value inherent to the FLCD which is dependent on various factors of the FLCD such as the structure and driving conditions, as well as the temperature and the kind of the FLC material.

Hereinafter, the present invention will be described by way of examples.

Figure 3:
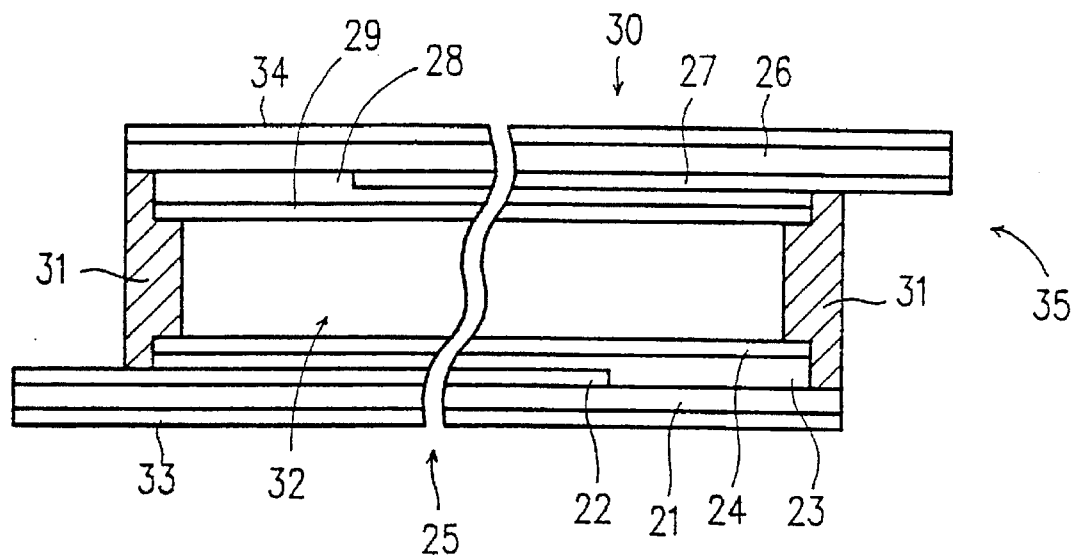
FIG. 3 is a cross-sectional view showing the configuration of a FLCD according to an example of the present invention.

FIG. 3 is a cross-sectional view of a FLCD 35 according to one example of the present invention. An electrically conductive film 22 to become an electrode, an insulating film 23, and an alignment film 24 are provided on an insulating substrate 21 in this order, thereby forming a lower substrate 25. An electrically conductive film 27 to become an electrode, an insulating film 28, and an alignment film 29 are provided on an insulating substrate 26 in this order, thereby forming an upper substrate 30. The lower substrate 25 and the upper substrate 30 are disposed so as to oppose each other. A region enclosed by the lower substrate 25, the upper substrate 30, and a sealant 31 accommodates a FLC layer 32. The FLC layer 32 has a tilt angle of 8° or less at (Tc−1)°C. On the opposite side of the insulating substrate 21 where the FLC layer 32 is disposed is a polarizer 33; on the opposite side of the insulating substrate 26 where the FLC layer 32 is disposed is a polarizer 34. The polarizers 33 and 34 are provided so that a viewer can optically identify changes in the optic axis of the FLC layer 32, i.e., changes in the polarization direction of light transmitted through the FLC layer 32. The FLCD 35 is thus constructed. The polarization directions of the polarizers 33 and 34 are set to be perpendicular to each other and one of the polarization directions is set to be parallel to one of the orientation direction of the FLC molecule in the memory state as shown by arrows G in FIG. 2.

Next, a method for producing the FLCD 35 will be described.

Transparent substrates, which are typically glass substrates, are used as the insulating substrates 21 and 26. The conductive films 22 and 27 are obtained by forming $InO_3$, $SnO_2$, ITO (Indium-Tin Oxide), or the like into predetermined patterns of transparent electrodes on the insulating substrates 21 and 26, respectively, by a Chemical Vapor Deposition (CVD) method or a sputtering method. The thicknesses of the conductive films 22 and 27 are preferably in the range of 50 to 200 nm.

On the conductive films 22 and 27, the insulating films 23 and 28 are formed so as to have a thickness in the range of 50 to 200 nm. The insulating films 23 and 28 can be composed of thin inorganic type films such as $SiO_2$, $SiN_x$, $Al_2O_3$, and $Ta_2O_5$, or organic type films such as polyimide, photoresist resin, and polymer liquid crystal, for example. If the insulating films 23 and 28 are composed of an inorganic type material, they can be formed by vapor deposition, sputtering, CVD, or a solution application method. If the insulating films 23 and 28 are composed of an organic type material, they can be formed by a spin coating method, soaking application method, a screen printing method, a roll coating method or the like using a solution in which an organic material is dissolved or a precursor solution thereof, and thereafter curing the material under appropriate curing conditions (heating, light irradiation, etc.); alternatively, they can be formed by vapor deposition, CVD, a LB (Langmuir Blodgett's) method, or the like. It is also applicable to omit the insulating films 23 and 28.

Furthermore, alignment films 24 and 29 are formed on the insulating films 23 and 28 so as to have a thickness in the range of 10 to 100 nm. In the case where the insulating films 23 and 28 are omitted, the alignment films 24 and 29 are formed directly on the conductive films 22 and 27. The alignment films 24 and 29 can be composed of inorganic type films or organic type films. Examples of inorganic materials for the alignment films 24 and 29 include silicon oxide and the like, and such alignment films 24 and 29 can be formed by known methods such as oblique evaporation or rotation evaporation method. Examples of organic materials for the alignment films 24 and 29 include nylon, polyvinyl alcohol, polyimide, and the like, and the surfaces of such alignment films 24 and 29 are usually rubbed. When polymer liquid crystal or LB films are used, it is possible to control the orientation directions of the alignment films 24 and 29 by applying a magnetic field or by a spacer edge method. It is also applicable to form $SiO_2$, $SiN_x$ as the alignment films 24 and 29 by vapor deposition, sputtering, a CVD method or the like, and rub the surfaces thereof. The lower substrate 25 and the upper substrate 30 thus obtained are attached to each other so as to oppose each other sealed with the sealant 31, and a FLC material is injected in an interspace therebetween so as to form the FLC layer 32. Thus, the FLCD 35 according to the present invention is obtained.

Figure 4:
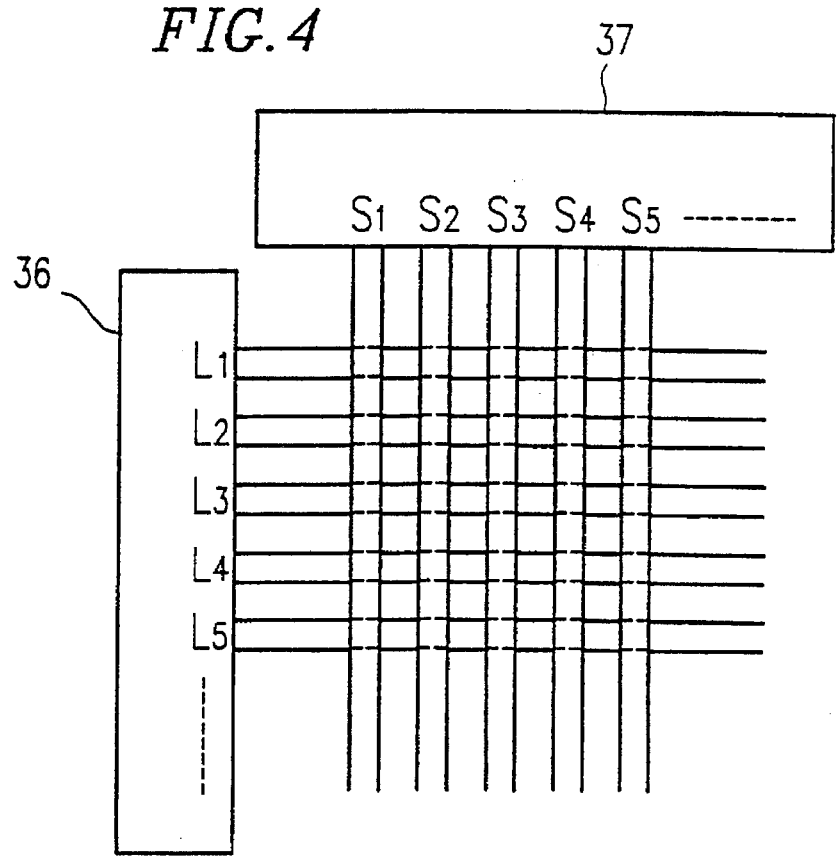
FIG. 4 is a schematic diagram showing a large-capacity FLCD, as an exemplary application of the FLCD of the present invention as a display device, in which electrode wires are used in a matrix shape.

Although the FLCD 35 is described as an optical switching element with one pixel in FIG. 3 for conciseness, the FLCD 35 can be applied to a display device of a large-capacity matrix. In this case, as shown in FIG. 4, the conductive films, which serve as transparent electrodes, on the upper and lower substrates are constructed in a matrix shape consisting of scanning electrodes L1, L2, L3, L4, L5, etc. and signal electrodes S1, S2, S3, S4, S5, etc. Regions where the scanning electrodes L1, L2, L3, L4, L5, etc. and the signal electrodes S1, S2, S3, S4, S5, etc. intersect one another define pixels. These pixels are driven by switching the optic axis of the LC layer by selectively applying a driving voltage by using a scanning electrode driving circuit 36 connected to the scanning electrodes L1, L2, L3, L4, L5, etc. and a signal electrode driving circuit 37 connected to the signal electrodes S1, S2, S3, S4, S5, etc.

Next, a method of uniaxial orientation treatment for the alignment films 24 and 29 of the FLCD according to the present invention will be described.

The most preferable method of uniaxial orientation treatment for the alignment films 24 and 29 of the FLCD is the rubbing method. The rubbing method is generally categorized into a parallel rubbing method, an antiparallel rubbing method, a one-side rubbing method, and the like. The parallel rubbing method rubs both the upper and lower substrates, the directions of rubbing for both substrates being the same. The antiparallel rubbing method rubs both the upper and lower substrates, the directions of rubbing for the substrates being parallel but opposite to each other. The one-side rubbing method rubs only the upper or lower substrate.

The one-side rubbing method has a problem in that it is difficult to obtain a uniform orientation state with this method. The reason for this is that FLC material is optically active, and the nematic phase of the FLC material inevitably has a helical structure. When the nematic phase shifts to the smectic A phase by cooling the FLC material, the helical structure of the nematic phase disturbs the uniform orientation of the normal axis of the smectic A phase layers.

The antiparallel rubbing method is likely to induce linear defects along the rubbing direction, making it difficult to obtain a uniform orientation.

The most preferable method of uniaxial orientation treatment for the alignment films 29 and 24 of the FLCD, so that a uniform orientation can be obtained including neatly aligned normal axes of the smectic layers, is the parallel rubbing method. By using the parallel rubbing method, both the upper and lower alignment films 29 and 24 control the orientation direction of the FLC molecules despite the helical structure of the nematic phase. As a result, it is relatively easy to obtain a uniform orientation in the nematic phase. By lowering the temperature from this state to those which induce the smectic A phase and further the chiral smectic C phase, a uniform orientation including neatly aligned normal axes of the smectic layers can be easily obtained.

As for the method of uniaxial orientation treatment for the alignment films 24 and 29 of the above FLCD, other methods such as the oblique evaporation method can also be used instead of the various rubbing methods.

The uniaxial orientation treatment provides the alignment films 24 and 29 with a pretilt angle. In the case of using polyimide for an alignment film, a pretilt angle of about 0° to 20° has been reported. The pretilt angle of the alignment films 24 and 29 of the FLCD of the present invention is preferably in the range of 1° to 10°.

Next, a method for driving the FLCD of the present invention will be described.

Examples of preferable methods for driving the FLCD of the present invention include the method proposed by Surguy et al. (P. W. H. Surguy et al., Ferroelectrics, 122, 63(1991)), supra. This method is effective for realizing high contrast. P. W. Ross, Proc, SID, 217(1992) discloses a FLC display utilizing this method.

Hereinafter, methods for driving a FLCD using a FLC material having a negative dielectric anisotropy will be described.

Figure 5A:
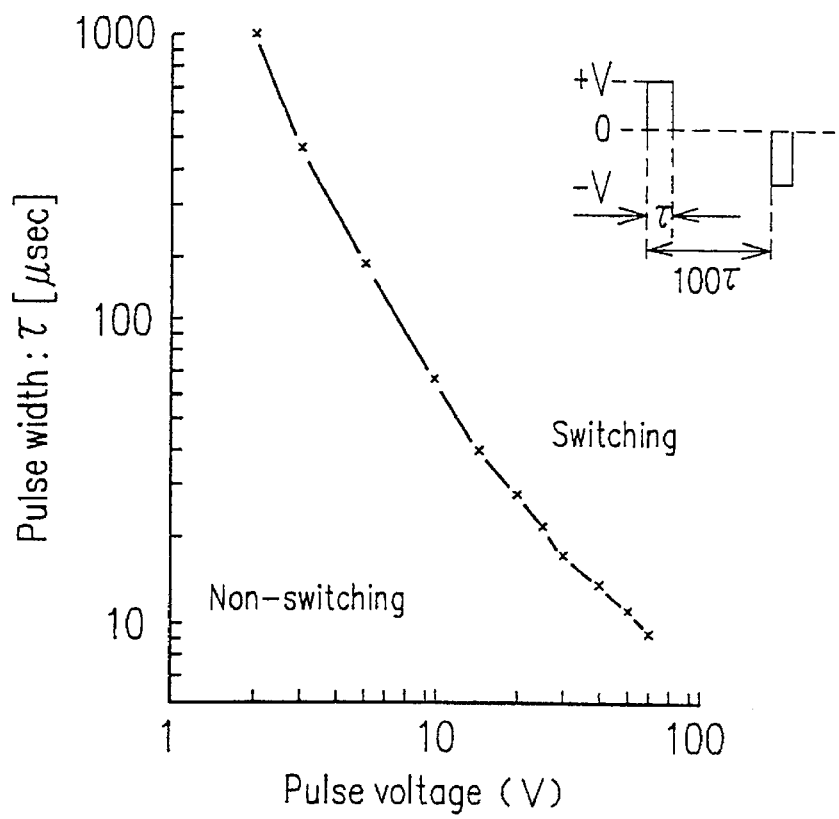
FIG. 5A shows the τ–V characteristics of an ordinary FLC material whose anisotropy of dielectric constant is not negative.
Figure 5B:
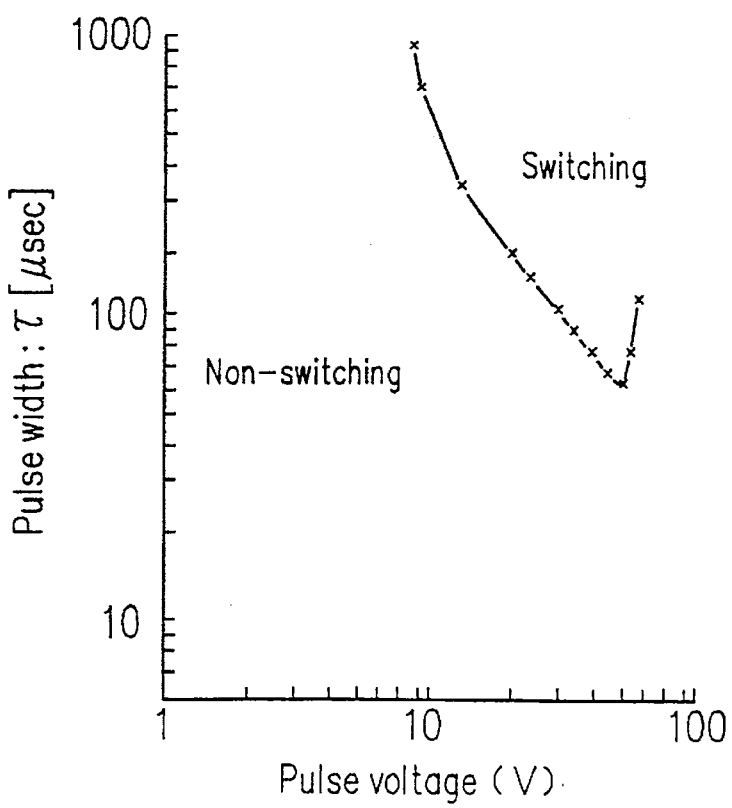
FIG. 5B shows the τ–V characteristics of a FLC material whose anisotropy of dielectric constant is negative.

FIG. 5A shows the relationship between a pulse width $\tau$ and a pulse voltage V of a monopolar pulse required for switching an ordinary FLC material, whose anisotropy of dielectric constant is not negative, from one stable state to the other. The $\tau$–V characteristic of FIG. 5A is such that the pulse width $\tau$ monotonously decreases as the pulse voltage V increases. On the other hand, as shown in FIG. 5B, a FLC material having a negative dielectric anisotropy provides $\tau$–V characteristics such that the pulse width $\tau$ has a minimal value.

Recently, as reported in J. C. Jones et al., Ferroelectrics, 121, 91(1991), biaxial dielectric anisotropy of a FLC material is considered to be more important than the sign of dielectric anisotropy in order that the pulse width $\tau$ of the $\tau$–V characteristics of a FLCD has a minimal value as shown in FIG. 5B.

Figure 6:
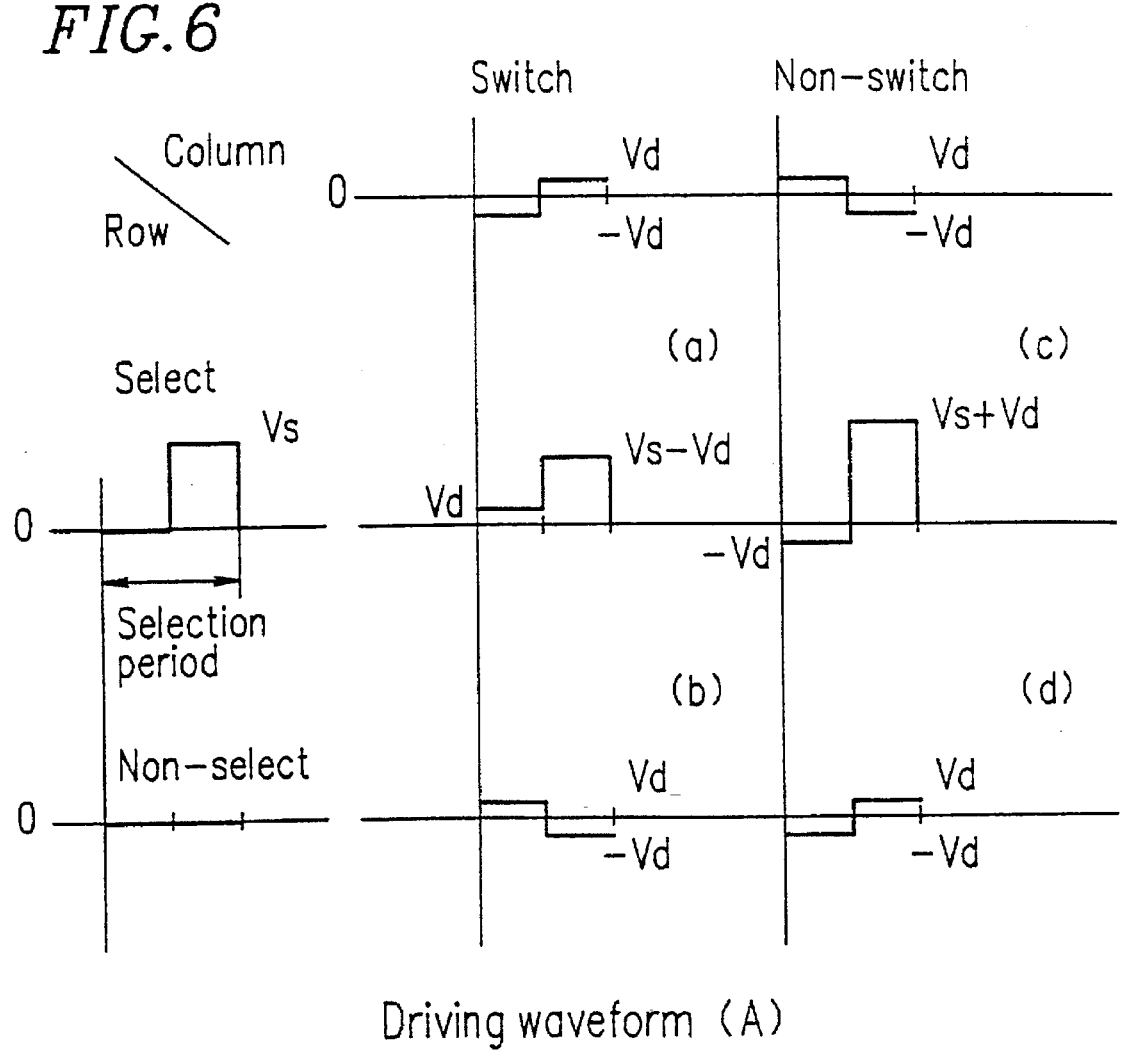
FIG. 6 is a waveform diagram showing a driving waveform (A) for driving a FLCD based on the τ–V characteristics shown in FIG. 5B.

As a driving method utilizing the above-mentioned $\tau$–V characteristics, Surguy et al. reports the JOERS/ Alvey driving scheme (supra), which utilizes a driving waveform (A) shown in FIG. 6. The principle of this driving method is schematically shown in FIG. 7. According to this method, the memory state of the FLCD is switched when a voltage |Vs−Vd| is applied thereto, but not switched when a voltage |Vs+Vd| (which is a higher voltage than |Vs−Vd|) or a voltage |Vd| is applied thereto.

Figure 8:
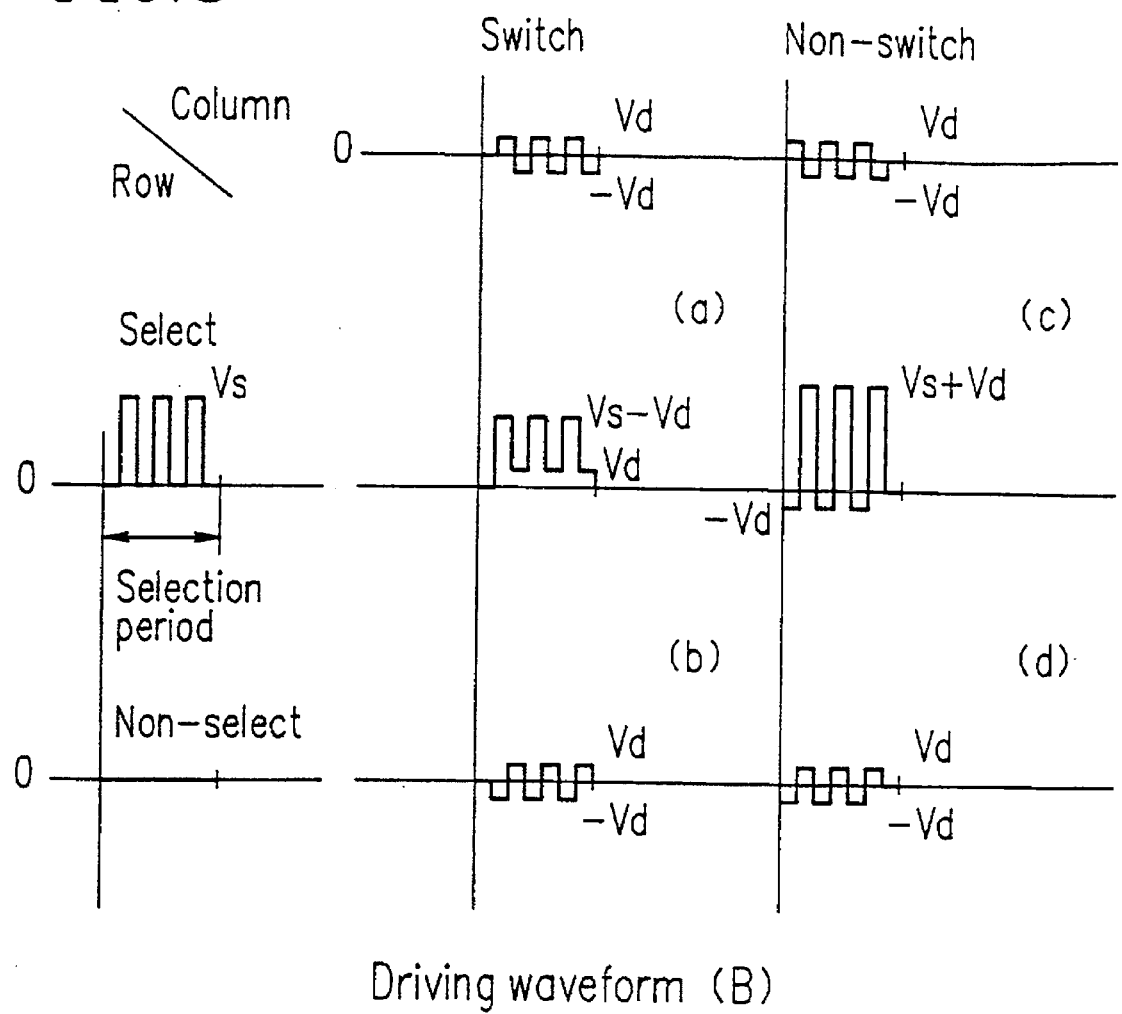
FIG. 8 is a waveform diagram showing a driving waveform (B) for driving a FLCD based on the τ–V characteristics shown in FIG. 5B.

Alternatively, a driving method utilizing a driving waveform (B) shown in FIG. 8 is also possible. These driving methods allow partial rewriting, and therefore are preferable for producing a large-capacity display, e.g., that of 2000× 2000 lines, by using the above FLCD. In the driving waveform (B), voltage waveforms represented as (a) to (d) are applied to pixels. The pulse widths $\tau$ when applying voltages of the waveforms (b) to (d) (which are applied when no rewriting is to be performed) are the same, and the respective transmitted light amounts are the same. Thus, excellent display with substantially no flickering is attained.

Figure 9:
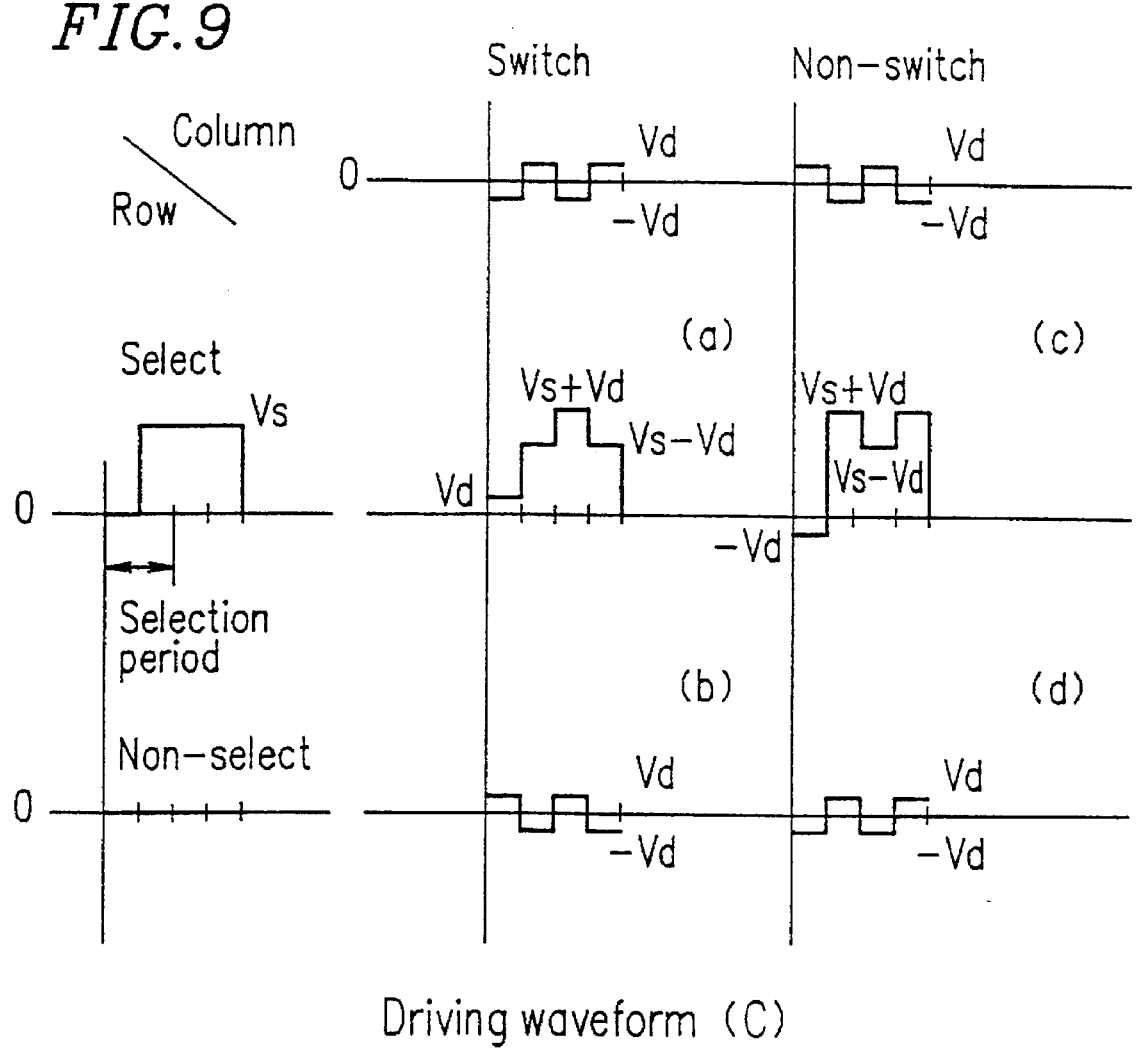
FIG. 9 is a waveform diagram showing a driving waveform (C) for driving a FLCD based on the τ–V characteristics shown in FIG. 5B.
Figure 10:
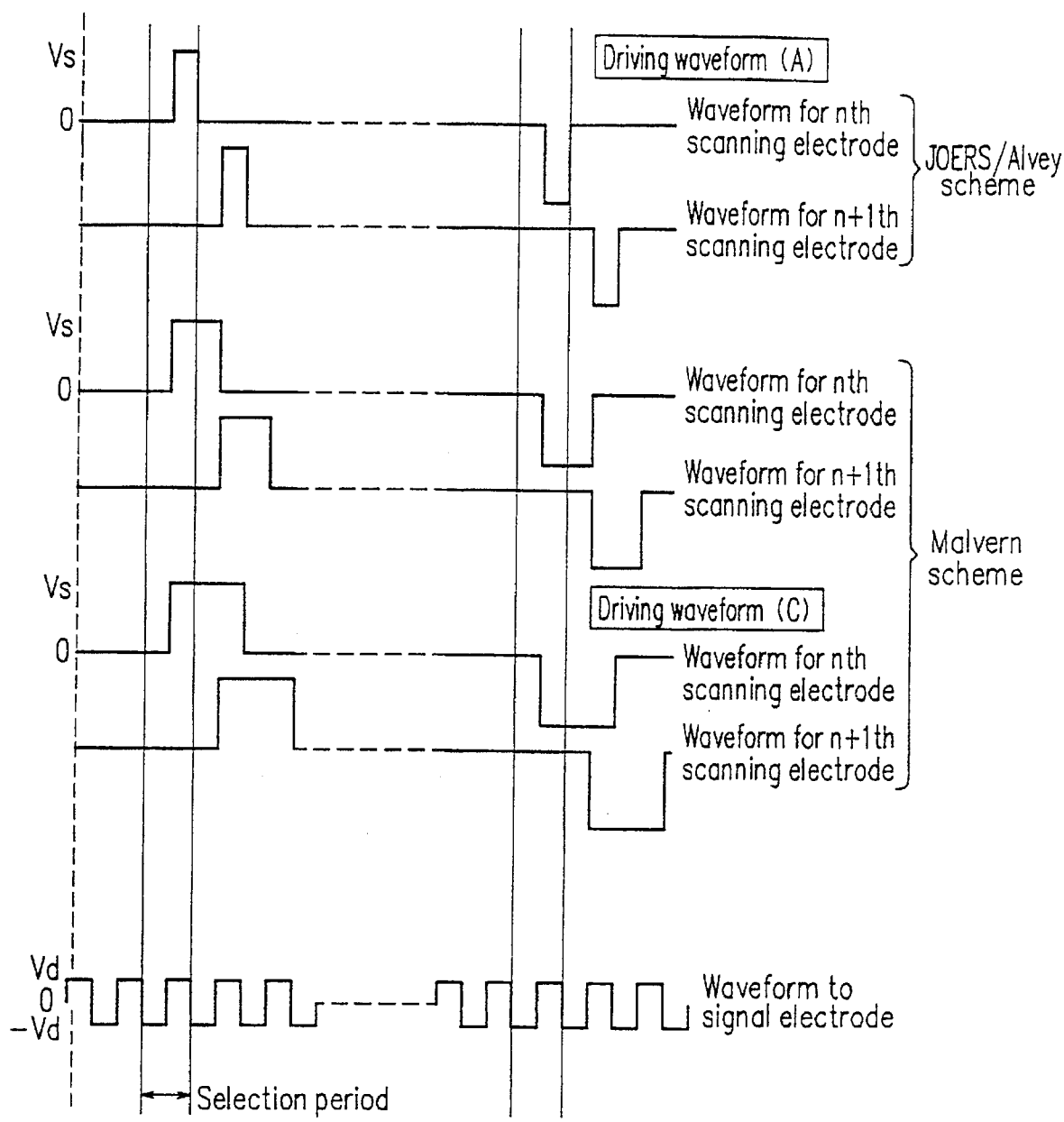
FIG. 10 is a waveform diagram describing a Malvern driving scheme using the waveform (C) in FIG. 9 for example.

A Malvern driving scheme (WO92/02925 (PCT), or Liquid Crystals, 1993, vol13, No. 4, 597–601), as exemplified in the driving waveform (C) in FIG. 9, operates on the following basis, as shown in FIG. 10: While the JOERS/ Alvey driving scheme, utilizing the driving waveform (a), operates based on 0V portions and main pulse portions (which are not at 0V) of one time slot, the Malvern driving scheme allows the width of the main pulse to be freely changed. Thus, the points of time at which to apply voltages can be made to overlap between electrodes, thereby allowing the line address time (selection time) to be reduced. Therefore, the Malvern scheme is certainly one of the preferable driving methods for the FLCD of the present invention.

As exemplified in the above driving methods, the driving methods for FLCD materials having τ–V characteristics such that the pulse width τ has a minimal value (as shown in FIG. 5B) have the following features.

According to any of these driving methods, voltages $V_1$, $V_2$, $V_3$, and $V_4$ defined as in the following i) to iii) are used:

i) $0 < V_2 < V_4$ and
$V_2 - V_1 < V_4 - V_3$ are satisfied;

ii) when a second pulse voltage $V_2$ is applied following a first pulse voltage $V_1$, or when a second pulse voltage $-V_2$ is applied following a first pulse voltage $-V_1$ to a pixel on a selected scanning electrode, the FLC molecules are placed in one or the other of the two stable states depending on the polarity of the applied voltage, irrespective of which stable state they were in before the application of the voltage; and iii) when a second pulse voltage $V_4$ is applied following a first pulse voltage $V_3$, or when a second pulse voltage $-V_4$ is applied following a first pulse voltage $-V_3$ to the above pixel, the stable state of the FLC molecules before the application of the voltage is maintained irrespective of the polarity of the applied voltage.

In other words, in the first two time slots in the selection period, the waveform to be used for retention has a higher second pulse voltage value and a larger difference between the first pulse voltage and the second pulse voltage than that of the waveform to be used for rewriting. For example, in the driving waveform (A) shown in FIG. 6, $V_1=Vd$, $V_2=Vs-Vd$, $V_3=-Vd$, and $V_4=Vs+Vd$;

in the driving waveform (B) shown in FIG. 8, $V_1=0$, $V_2=Vs-Vd$, $V_3=-Vd$, and $V_4=Vs+Vd$; and in the driving waveform (C) shown in FIG. 9, $V_1=Vd$, $V_2=Vs-Vd$, $V_3=-Vd$, and $V_4=Vs+Vd$.

In the τ–V characteristics shown in FIG. 5B, a voltage Vmin corresponding to a minimal value τmin of the pulse width is directly related to the maximum value of the voltage applied when driving the FLCD. The withstand voltage of any driving circuit used for driving the FLCD will require such a FLC material that the Vmin becomes 60 V or less. A driving circuit incorporating common IC drivers will require such a FLC material that the Vmin becomes 40 V or less.

In the case of driving a FLC material having τ–V characteristics such that the pulse width τ has a minimal value as shown in FIG. 5B, regions with different driving characteristics can be provided within one pixel by appropriately modifying the element structure, e.g., the cell gap or the electrode shapes. Thus, a waveform to be used for rewriting of a given region of the pixel can be utilized as a waveform for retention in another region of the same pixel, or vice versa. As a result, it becomes possible to perform gray-scale display.

In the foregoing portion of the specification, FLC materials having a negative dielectric anisotropy, the parallel rubbing treatment, and certain driving methods have been described as the very preferable applications of the FLCD of the present invention. However, the present invention is not to be limited to the present example. It will be appreciated that other kinds of FLC materials, FLCDs, driving methods are also applicable to the present invention.

Moreover, the parallel rubbing method is adopted as the uniaxial orientation treatment for the alignment films 24 and 29 of the FLCD in the present example. However, other methods such as the oblique vapor deposition method can also be adopted as the orientation treatment method.

(FLC material)

FLC mixtures 1 to 10 of the respective compositions shown in Table 3 were prepared by using LC compounds 1 to 17 (shown in Table 1) and Chiral compounds 18 and 19 (shown in Table 2). The phase transition temperatures of the FLC mixtures 1 to 10 are shown in Table 4.

TABLE 1

| LC compound | | Chemical structure |
|---|---|---|
| LC1 | m = 8 | |
| LC2 | m = 9 | $C_mH_{2m+1}O$—◯—◯(F)—◯—$OC_8H_{17}$ |
| LC3 | m = 10 | |
| | | |
| LC4 | m = 5, n = 8 | |
| LC5 | m = 8, n = 5 | $C_mH_{2m+1}O$—◯(F)—◯(F)—◯—$C_nH_{2n+1}$ |
| LC6 | m = 8, n = 8 | |
| | | |
| LC7 | m = 7, n = 7 | |
| LC8 | m = 7, n = 8 | |
| LC9 | m = 7, n = 9 | $C_mH_{2m+1}$—◯(N,N)—◯—$OC_nH_{2n+1}$ |
| LC10 | m = 8, n = 8 | |
| LC11 | m = 8, n = 10 | |
| LC12 | m = 9, n = 6 | |
| | | |
| LC13 | | $C_{10}H_{21}O$—◯—COO—◯—$C_3H_{17}$ |

TABLE 1-continued
| LC compound | Chemical structure |
|---|---|
| LC14 | 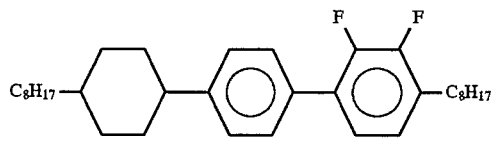 |
| LC15 | 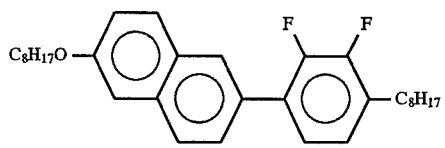 |
| LC16 | 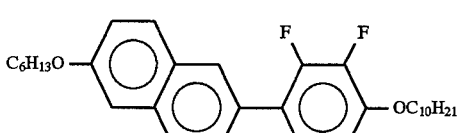 |
| LC17 | 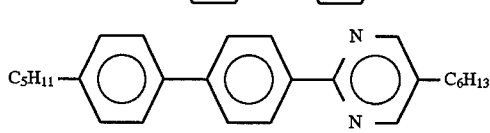 |
TABLE 2
| Chiral compound | Chemical structure |
|---|---|
| Chiral compound 18 | 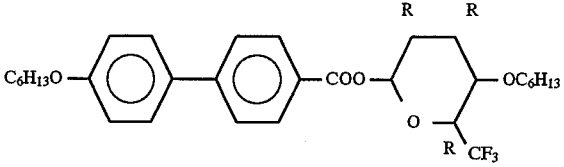 |
| Chiral compound 19 | 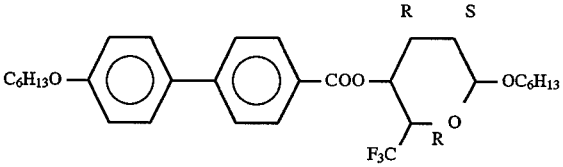 |
TABLE 3
| FLC mixture | LC compound (wt %) | | | | | | | | | | | | Chiral compound (wt %) | |
|---|---|---|---|---|---|---|---|---|---|---|---|---|---|---|
| | 1 | 2 | 3 | 4 | 5 | 6 | 12 | 13 | 14 | 15 | 16 | 17 | 18 | 19 |
| FLC1 | 16.5 | 16.5 | 16.5 | 16.5 | 16.5 | 16.5 | | | | | | | 0.7 | 0.3 |
| FLC2 | 14.8 | 14.8 | 14.8 | 14.8 | 14.8 | 14.8 | 10.0 | | | | | | 0.7 | 0.3 |
| FLC3 | 13.2 | 13.2 | 13.2 | 13.2 | 13.2 | 13.2 | 20.0 | | | | | | 0.7 | 0.3 |
| FLC4 | 14.8 | 14.8 | 14.8 | 14.8 | 14.8 | 14.8 | | 10.0 | | | | | 0.7 | 0.3 |
| FLC5 | 13.2 | 13.2 | 13.2 | 13.2 | 13.2 | 13.2 | | 20.0 | | | | | 0.7 | 0.3 |
| FLC6 | 14.8 | 14.8 | 14.8 | 14.8 | 14.8 | 14.8 | | | 10.0 | | | | 0.7 | 0.3 |
| FLC7 | 13.2 | 13.2 | 13.2 | 13.2 | 13.2 | 13.2 | | | 20.0 | | | | 0.7 | 0.3 |
| FLC8 | 13.2 | 13.2 | 13.2 | 13.2 | 13.2 | 13.2 | | | | 20.0 | | | 0.7 | 0.3 |
| FLC9 | 14.8 | 14.8 | 14.8 | 14.8 | 14.8 | 14.8 | | | | | 10.0 | | 0.7 | 0.3 |
| FLC10 | 14.8 | 14.8 | 14.8 | 14.8 | 14.8 | 14.8 | | | | | | 10.0 | 0.7 | 0.3 |

TABLE 4

| FLC mixture | Phase transition temperature (°C.) | | | | | | |
|---|---|---|---|---|---|---|---|
| | S*$_C$ | | S$_A$ | | N* | | I |
| FLC1 | • | 70 | • | 82 | • | 88 | • |
| FLC2 | • | 65 | • | 78 | • | 84 | • |
| FLC3 | • | 61 | • | 75 | • | 82 | • |
| FLC4 | • | 60 | • | 79 | • | 85 | • |
| FLC5 | • | 47 | • | 77 | • | 83 | • |
| FLC6 | • | 62 | • | 84 | • | 89 | • |
| FLC7 | • | 49 | • | 86 | • | 91 | • |
| FLC8 | • | 67 | • | 81 | • | 87 | • |
| FLC9 | • | 73 | • | 83 | • | 90 | • |
| FLC10 | • | 75 | • | 82 | • | 94 | • |

Furthermore, FLC mixtures 11 to 20 of the respective compositions shown in Table 5 were prepared by using LC compounds 1 to 17 (shown in Table 1) and Chiral compounds 18 and 19 (shown in Table 2). The phase transition temperatures of the FLC mixtures 11 to 20 are shown in Table 6.

TABLE 5

| FLC mixture | LC compound (wt %) | | | | | | | | | | | | | Chiral compound (wt %) | |
|---|---|---|---|---|---|---|---|---|---|---|---|---|---|---|---|
| | 4 | 7 | 8 | 9 | 10 | 11 | 12 | 13 | 14 | 15 | 16 | 17 | | 18 | 19 |
| FLC11 | | 5.0 | 9.9 | 14.9 | 19.8 | 29.7 | 19.8 | | | | | | | 0.7 | 0.3 |
| FLC12 | 10.0 | 4.5 | 8.9 | 13.4 | 17.8 | 26.7 | 17.8 | | | | | | | 0.7 | 0.3 |
| FLC13 | 20.0 | 4.0 | 7.9 | 11.9 | 15.8 | 23.7 | 15.8 | | | | | | | 0.7 | 0.3 |
| FLC14 | | 4.5 | 8.9 | 13.4 | 17.8 | 26.7 | 17.8 | 10.0 | | | | | | 0.7 | 0.3 |
| FLC15 | | 4.5 | 8.9 | 13.4 | 17.8 | 26.7 | 17.8 | | 10.0 | | | | | 0.7 | 0.3 |
| FLC16 | | 4.0 | 7.9 | 11.9 | 15.8 | 23.7 | 15.8 | | 20.0 | | | | | 0.7 | 0.3 |
| FLC17 | | 4.0 | 7.9 | 11.9 | 15.8 | 23.7 | 15.8 | | | 20.0 | | | | 0.7 | 0.3 |
| FLC18 | | 4.5 | 8.9 | 13.4 | 17.8 | 26.7 | 17.8 | | | | 10.0 | | | 0.7 | 0.3 |
| FLC19 | | 4.5 | 8.9 | 13.4 | 17.8 | 26.7 | 17.8 | | | | | 10.0 | | 0.7 | 0.3 |
| FLC20 | | 4.0 | 7.9 | 11.9 | 15.8 | 23.7 | 15.8 | | | | | 20.0 | | 0.7 | 0.3 |

TABLE 6

| FLC mixture | Phase transition temperature (°C.) | | | | | | |
|---|---|---|---|---|---|---|---|
| | S*$_C$ | | S$_A$ | | N* | | I |
| FLC11 | • | 52 | • | 63 | • | 69 | • |
| FLC12 | • | 56 | • | 65 | • | 72 | • |
| FLC13 | • | 60 | • | 68 | • | 76 | • |
| FLC14 | • | 40 | • | 62 | • | 67 | • |
| FLC15 | • | 45 | • | 66 | • | 71 | • |
| FLC16 | • | 34 | • | 69 | • | 73 | • |
| FLC17 | • | 48 | • | 59 | • | 66 | • |
| FLC18 | • | 55 | • | 57 | • | 69 | • |
| FLC19 | • | 55 | • | 67 | • | 77 | • |
| FLC20 | • | 58 | • | 70 | • | 84 | • |

FLC mixtures 21 to 24 of the respective compositions shown in Table 7 were prepared by using a FLC mixture produced by Merck & Co., Inc. (designated as MLC-6072-000) and LC compounds 12 and 14 shown in Table 1. The phase transition temperatures of the FLC mixture (MLC-6072-000) and the FLC mixtures 21 to 24 are shown in Table 8.

TABLE 7

| FLC mixture | MLC-6072-000 (wt %) | LC compound (wt %) | |
|---|---|---|---|
| | | LC12 | LC14 |
| FLC21 | 90.0 | 10.0 | |
| FLC22 | 80.0 | 20.0 | |
| FLC23 | 90.0 | | 10.0 |
| FLC24 | 80.0 | | 20.0 |

TABLE 8

| FLC mixture | Phase transition temperature (°C.) | | | | | | |
|---|---|---|---|---|---|---|---|
| | S*$_C$ | | S$_A$ | | N* | | I |
| MLC-6072-000 | • | 61 | • | 62 | • | 69 | • |
| FLC21 | • | 60 | • | 63 | • | 69 | • |
| FLC22 | • | 59 | • | 64 | • | 69 | • |
| FLC23 | • | 56 | • | 66 | • | 71 | • |
| FLC24 | • | 49 | • | 69 | • | 73 | • |

(alignment films)

Alignment films were formed and the pretilt angle of the alignment films was evaluated prepared as described below.

A transparent electrode composed of ITO having a thickness of 100 nm was formed on each of two glass substrates. An insulating film composed of SiO$_2$ having a thickness of 100 nm was formed on each transparent electrode. A polyimide alignment film having a thickness of 50 nm was applied on each insulating film. The polyimide alignment films were obtained by condensing a main material of 2,2-bis[4-(4-aminophenoxy)phenyl]propane and 1,2,4,5-benzentetracarbonic acid dianhydride with a small amount of 4-(trimethoxy)silyl aniline. The polyimide alignment films were then subjected to a rubbing treatment. The two glass substrates were attached to each other in such a manner that the rubbing directions of the alignment films are anti-parallel to each other, while securing a cell thickness of 50

μm. Then, Nematic liquid crystal mixture E-8 (produced by Merck & Co., Inc.) was injected in the cell thus fabricated so as to form a test cell for measuring a pretilt angle of the alignment films. The pretilt angle was measured by a magnetic field-capacitance method (K. Suzuki, K. Toriyama and A. Fukuhara, Appl. Phys. Lett. 33, 561 (1978)). The obtained pretilt angle of the alignment films was 3 degrees. (FLC cell)

The two glass substrates, on which the abovementioned alignment films were formed and subjected to the rubbing treatment, were attached to each other in such a manner that the rubbing directions of the alignment films are parallel to each other, while securing a cell thickness of 1.7 μm. Thus, a cell for the FLCD was produced.
(FLCD)

The FLC mixtures 1 to 10 were injected in each of the cells thus fabricated so as to form FLCDs 1 to 10.

Figure 11:
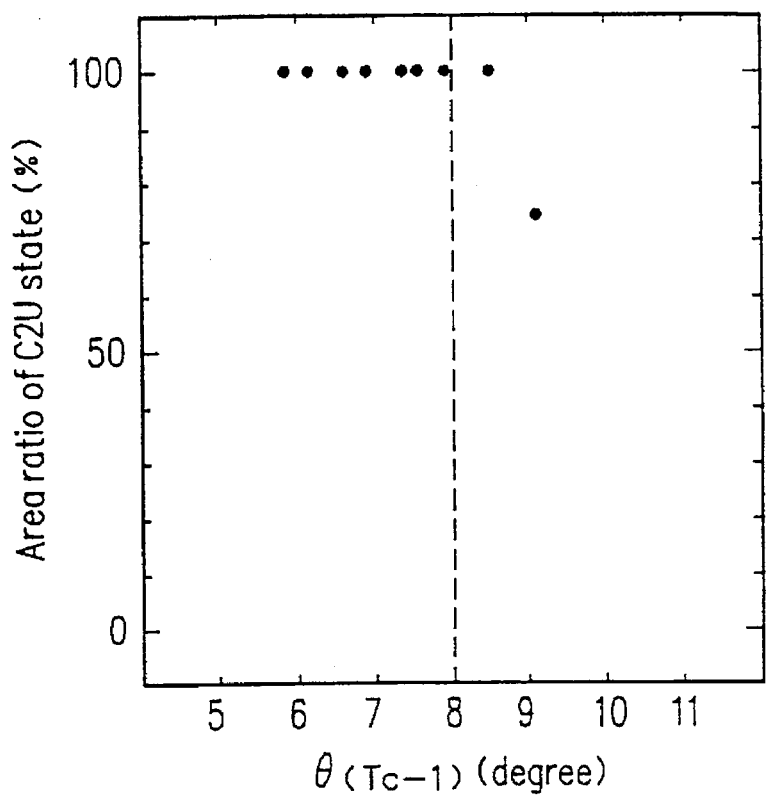
FIG. 11 shows the relationship between the orientation states and tilt angles in FLCDs according to the present invention.
Figure 12:
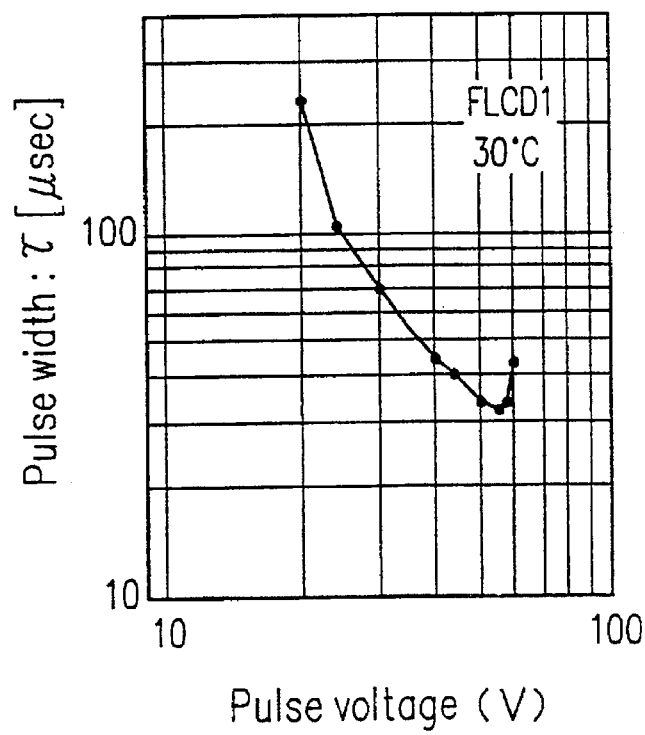
FIG. 12 is a graph showing the τ–V characteristics of FLCD 1 according to the present invention.
Figure 13:
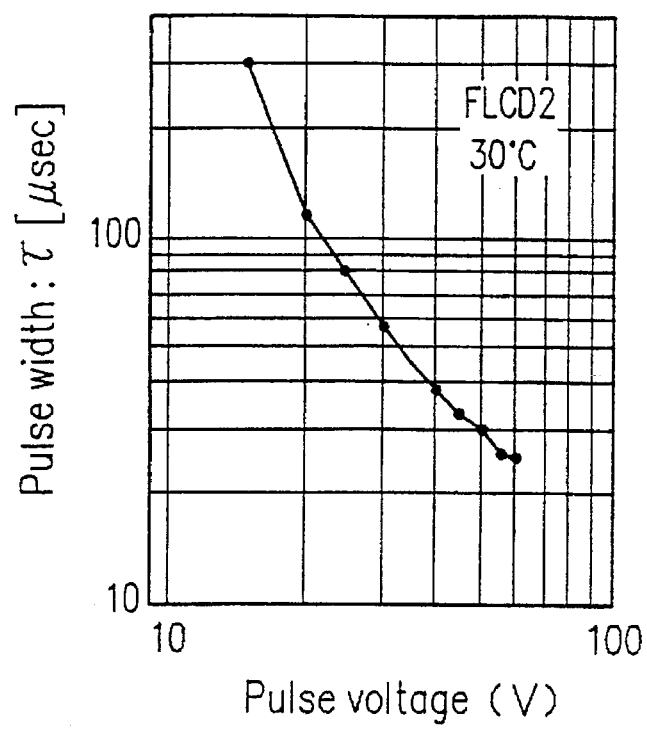
FIG. 13 is a graph showing the τ–V characteristics of FLCD 2 according to the present invention.
Figure 14:
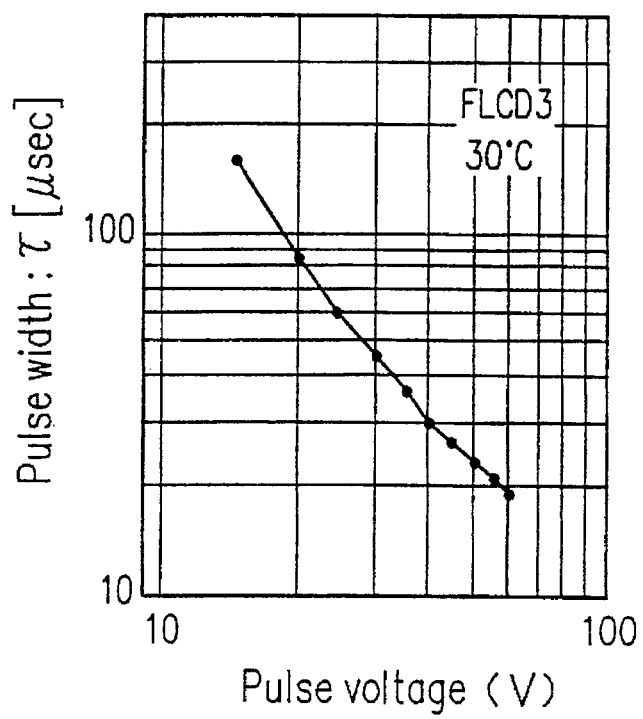
FIG. 14 is a graph showing the τ–V characteristics of FLCD 3 according to the present invention.
Figure 15:
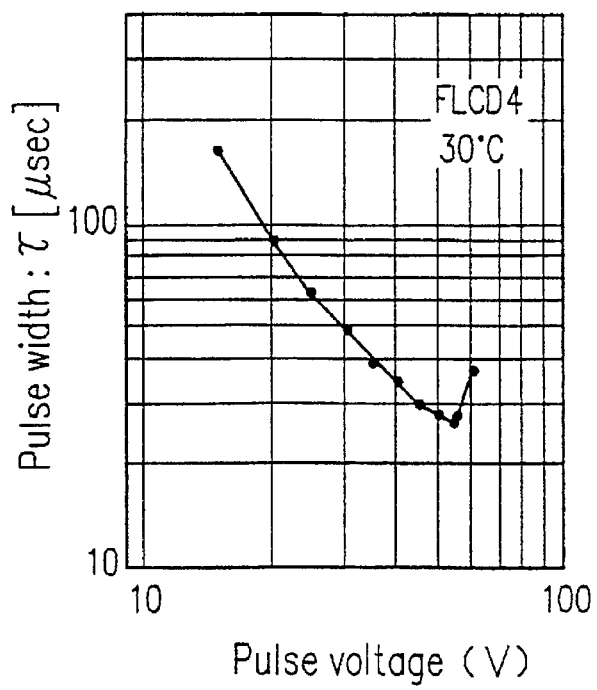
FIG. 15 is a graph showing the τ–V characteristics of FLCD 4 according to the present invention.
Figure 16:
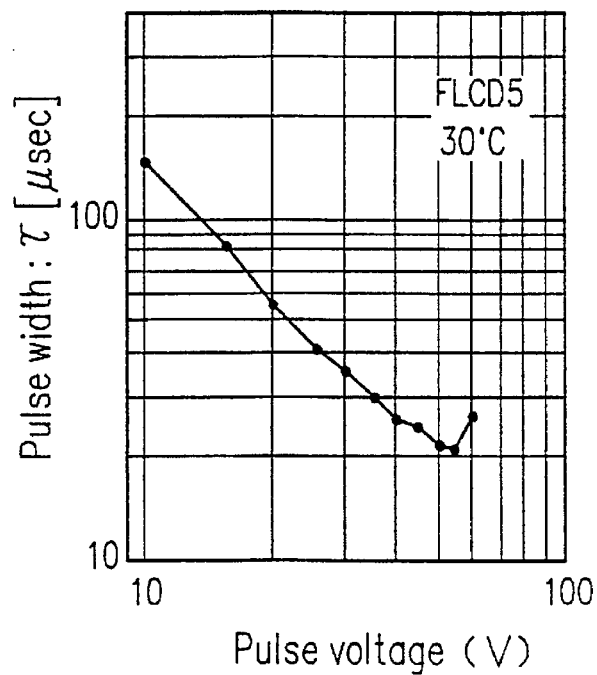
FIG. 16 is a graph showing the τ–V characteristics of FLCD 5 according to the present invention.
Figure 17:
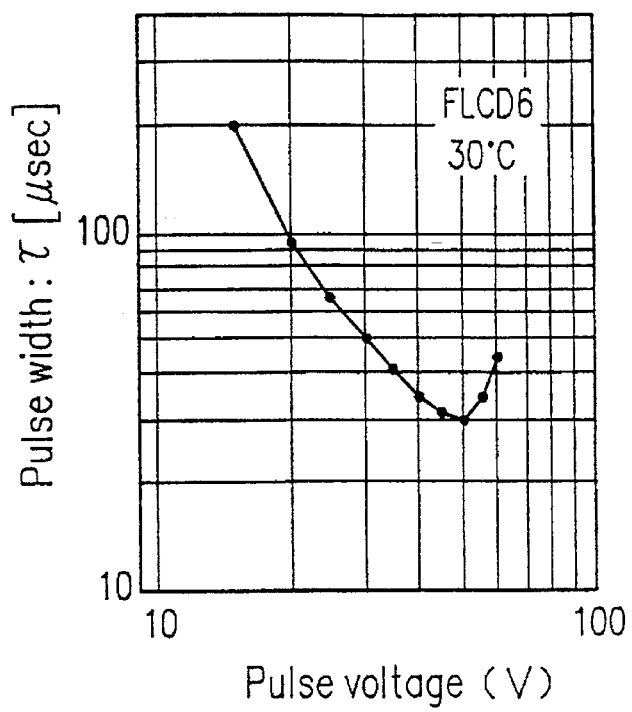
FIG. 17 is a graph showing the τ–V characteristics of FLCD 6 according to the present invention.
Figure 18:
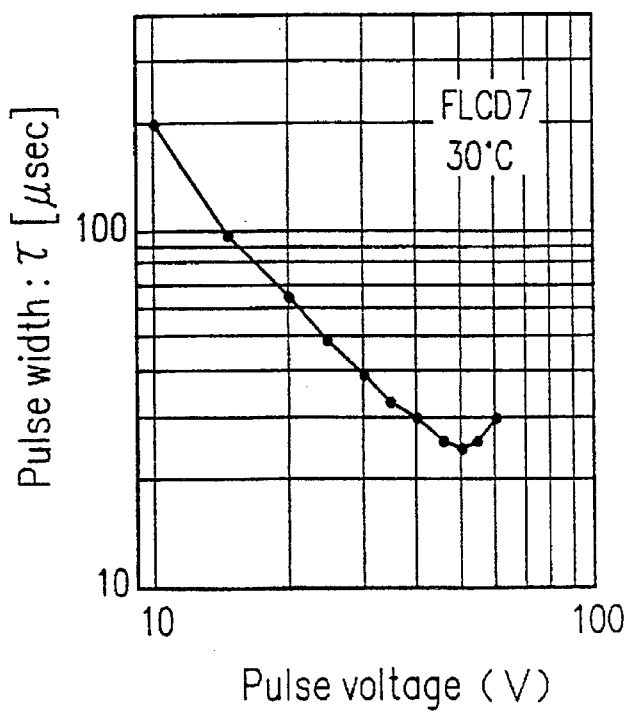
FIG. 18 is a graph showing the τ–V characteristics of FLCD 7 according to the present invention.
Figure 19:
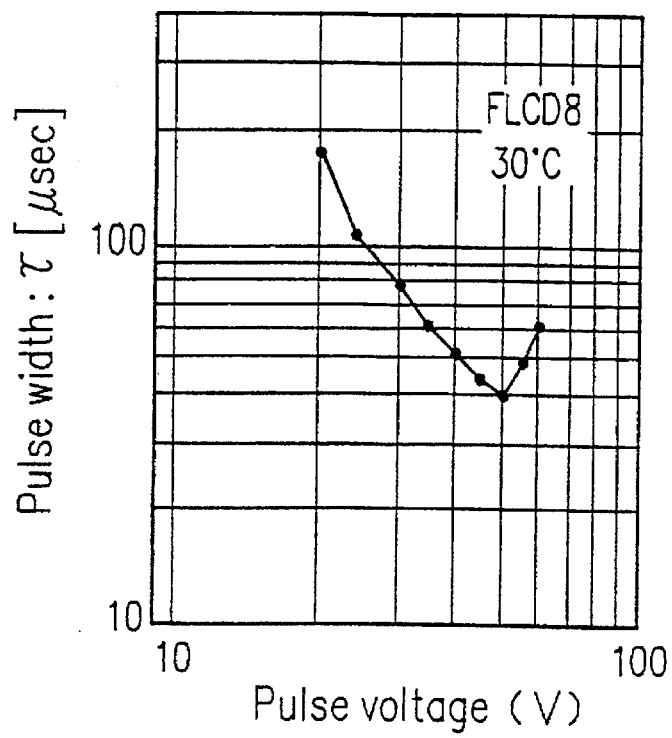
FIG. 19 is a graph showing the τ–V characteristics of FLCD 8 according to the present invention.
Figure 20:
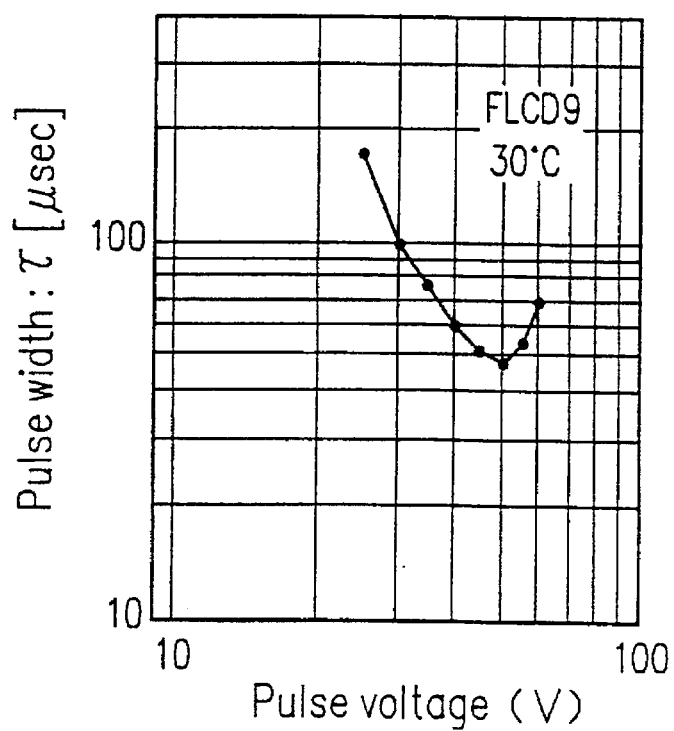
FIG. 20 is a graph showing the τ–V characteristics of FLCD 9 according to the present invention.

Table 9 and FIG. 11 show the orientation states and tilt angles θ (Tc−1) at a temperature (Tc−1)°C. (where Tc°C. is the uppermost temperature limit of the chiral smectic C phase for each FLC mixture) of FLCDs 1 to 10. As seen from Table 9 and FIG. 11, FLCDs 1 to 9, whose θ (Tc−1) is 8.5° or less, achieved a uniform C2 state over the entire LC layer.

The tilt angle was defined as ½ of an angle between two extinction positions as detected with a photodiode by applying a square wave (±20 V, 250 Hz) to the respective FLCDs disposed between two polarizers located perpendicular to each other.

TABLE 9

| FLCD | Area ratio of orientation states (%) | | Tilt angle θ (Tc − 1) (degree) |
|---|---|---|---|
| | C2U | C1U | |
| FLCD1 | 100 | 0 | 7.8 |
| FLCD2 | 100 | 0 | 7.5 |
| FLCD3 | 100 | 0 | 7.3 |
| FLCD4 | 100 | 0 | 6.8 |
| FLCD5 | 100 | 0 | 6.1 |
| FLCD6 | 100 | 0 | 6.5 |
| FLCD7 | 100 | 0 | 5.8 |
| FLCD8 | 100 | 0 | 7.5 |
| FLCD9 | 100 | 0 | 8.5 |
| FLCD10 | 75 | 25 | 9.1 |

The τ-V (pulse width-voltage) characteristics of FLCDs 1 to 9, which achieved the C2 state over the entire LC layer, were measured at 30° C. The values τ and V are defined as the pulse width and the pulse voltage, respectively, of a unipolar pulse required for switching the FLC material from one stable state to the other. Then, minimal pulse widths τmin and the corresponding pulse voltages Vmin were obtained, as shown in Table 10 and FIGS. 12 to 20.

TABLE 10

| FLCD | τ-V characteristic of FLCD at 30° C. | |
|---|---|---|
| | Vmin (V) | τmin (μsec) |
| FLCD1 | 53 | 33 |
| FLCD2 | >60 | — |
| FLCD3 | >60 | — |
| FLCD4 | 54 | 27 |
| FLCD5 | 55 | 21 |
| FLCD6 | 50 | 30 |
| FLCD7 | 50 | 24 |

TABLE 10-continued

| FLCD | τ-V characteristic of FLCD at 30° C. | |
|---|---|---|
| | Vmin (V) | τmin (μsec) |
| FLCD8 | 50 | 41 |
| FLCD9 | 50 | 48 |

FLCDs 1 to 9, which achieved the C2 state over the entire LC layer, were driven at 30° C. with the driving waveform (C) shown in FIG. 9. The driving conditions and results are shown in Table 11. The driving memory angle cited in Table 11 is defined as an angle between the extinction positions due to two memory states when the FLCD is being driven.

TABLE 11

| FLCD | Driving characteristic of FLCD at 30° C. | | | | |
|---|---|---|---|---|---|
| | τ (μsec) | Vs (V) | Vd (V) | Line address time (μsec) | Driving memory angle (degree) |
| FLCD1 | 15 | 46 | 10 | 30 | 27.6 |
| FLCD2 | 11 | 50 | 10 | 22 | 25.5 |
| FLCD3 | 10 | 48 | 12 | 20 | 25.0 |
| FLCD4 | 12 | 47 | 10 | 24 | 24.6 |
| FLCD5 | 9 | 48 | 12 | 18 | 20.0 |
| FLCD6 | 13 | 45 | 10 | 26 | 24.0 |
| FLCD7 | 11 | 50 | 10 | 22 | 18.9 |
| FLCD8 | 20 | 42 | 10 | 40 | 27.5 |
| FLCD9 | 23 | 44 | 10 | 46 | 31.0 |

The FLC mixtures 11 to 20 were injected in each of the cells fabricated in the above-mentioned manner so as to form FLCDs 11 to 20.

Figure 21:
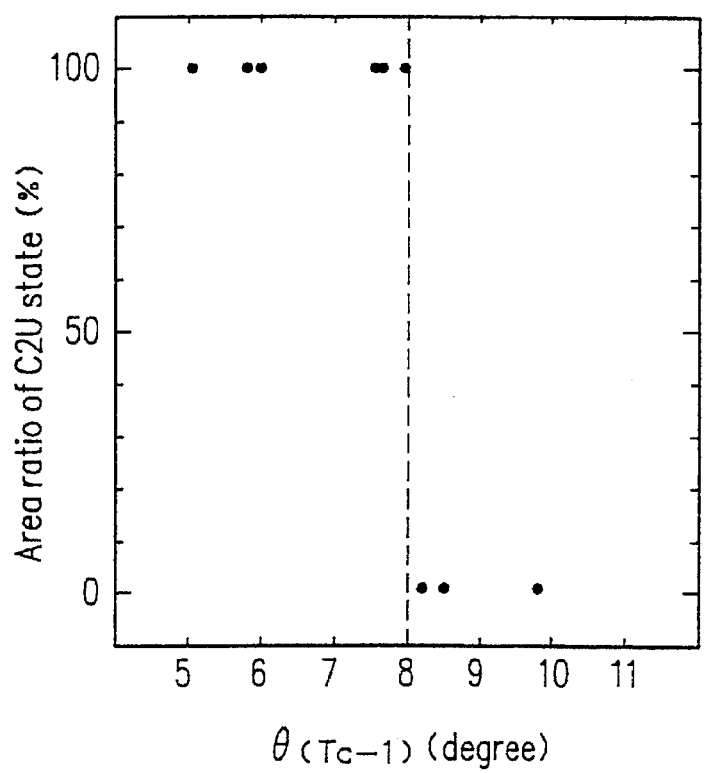
FIG. 21 shows the relationship between the orientation states and tilt angles in FLCDs according to the present invention.

Table 12 and FIG. 21 show the orientation states and tilt angles θ (Tc−1) at a temperature (Tc−1)°C. (where Tc°C. is the uppermost temperature limit of the chiral smectic C phase for each FLC mixture) of FLCDs 1 to 10. As seen from Table 12 and FIG. 21, FLCDs 11, 14, 15, 16, 17, 19, and 20, whose θ (Tc−1) is 8° or less, achieved a uniform C2 state over the entire LC layer.

The tilt angle was defined as ½ of an angle between two extinction positions as detected with a photodiode by applying a square wave (±20 V, 250 Hz) to the respective FLCDs disposed between two polarizers located perpendicular to each other.

TABLE 12

| FLCD | Area ratio of orientation states (%) | | Tilt angle θ (Tc − 1) (degree) |
|---|---|---|---|
| | C2U | C1U | |
| FLCD11 | 100 | 0 | 7.7 |
| FLCD12 | 0 | 100 | 8.2 |
| FLCD13 | 0 | 100 | 8.5 |
| FLCD14 | 100 | 0 | 5.8 |
| FLCD15 | 100 | 0 | 6.0 |
| FLCD16 | 100 | 0 | 5.0 |
| FLCD17 | 100 | 0 | 7.9 |
| FLCD18 | 0 | 100 | 9.7 |
| FLCD19 | 100 | 0 | 7.6 |
| FLCD20 | 100 | 0 | 7.7 |

The FLC mixture (MLC-6072-000) and FLC mixtures 21 to 24 were injected in each of the cells fabricated in the above-mentioned manner so as to form FLCDMLC and FLCDs 21 to 24.

Figure 22:
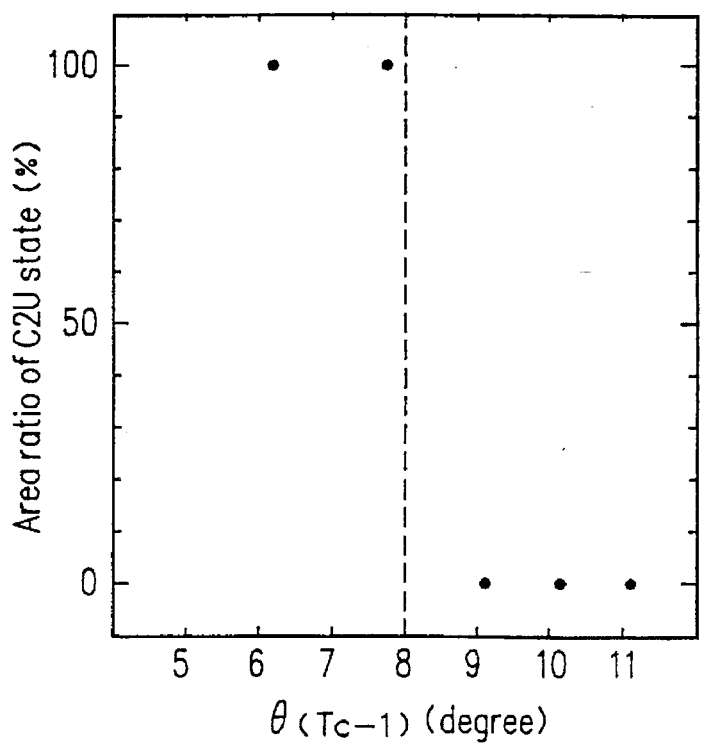
FIG. 22 shows the relationship between the orientation states and tilt angles in FLCDs according to the present invention.

Table 13 and FIG. 22 show the orientation states and tilt angles θ (Tc−1) at a temperature (Tc−1)°C. (where Tc°C. is the uppermost temperature limit of the chiral smectic C phase for each FLC mixture) of MLC-6072-000 and FLC mixtures 21 to 24 of FLCD-MLC and FLCDs 21 to 24. As seen from Table 13 and FIG. 22, FLCDs 23 and 24, whose θ (Tc−1) is 8° or less, achieved a uniform C2 state over the entire LC layer.

The tilt angle was defined as ½ of an angle between two extinction positions as detected with a photodiode by applying a square wave (±20 V, 250 Hz) to the respective FLCDs disposed between two polarizers located perpendicular to each other.

TABLE 13

| FLCD | Area ratio of orientation states (%) | | Tilt angle θ (Tc − 1) (degree) |
|---|---|---|---|
| | C2U | C1U | |
| FLCD-MLC | 0 | 100 | 11.1 |
| FLCD21 | 0 | 100 | 10.2 |
| FLCD22 | 0 | 100 | 9.1 |
| FLCD23 | 100 | 0 | 7.7 |
| FLCD24 | 100 | 0 | 6.2 |

Figure 23:
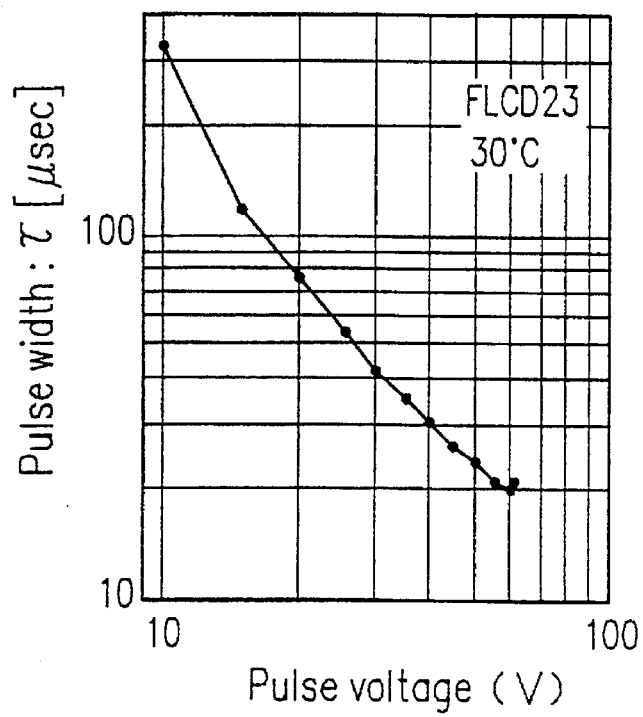
FIG. 23 is a graph showing the τ–V characteristics of FLCD 23 according to the present invention.
Figure 24:
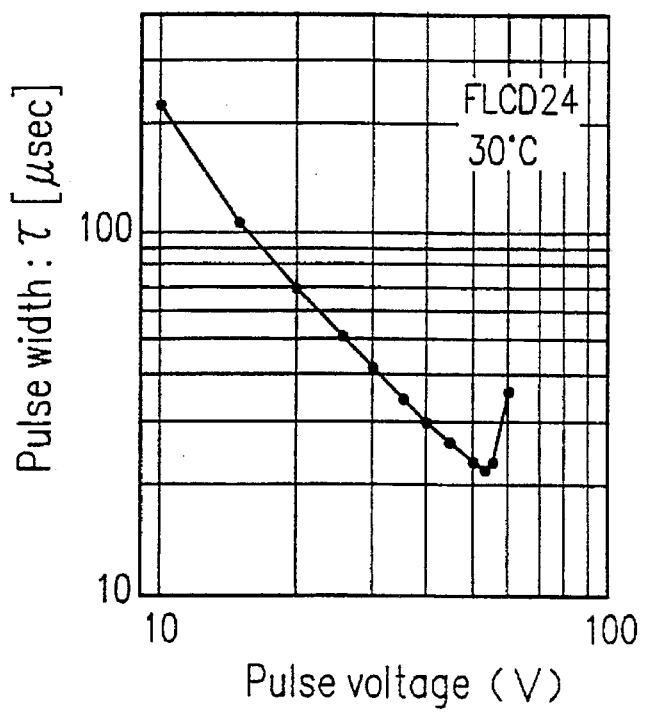
FIG. 24 is a graph showing the τ–V characteristics of FLCD 24 according to the present invention.
Figure 25:
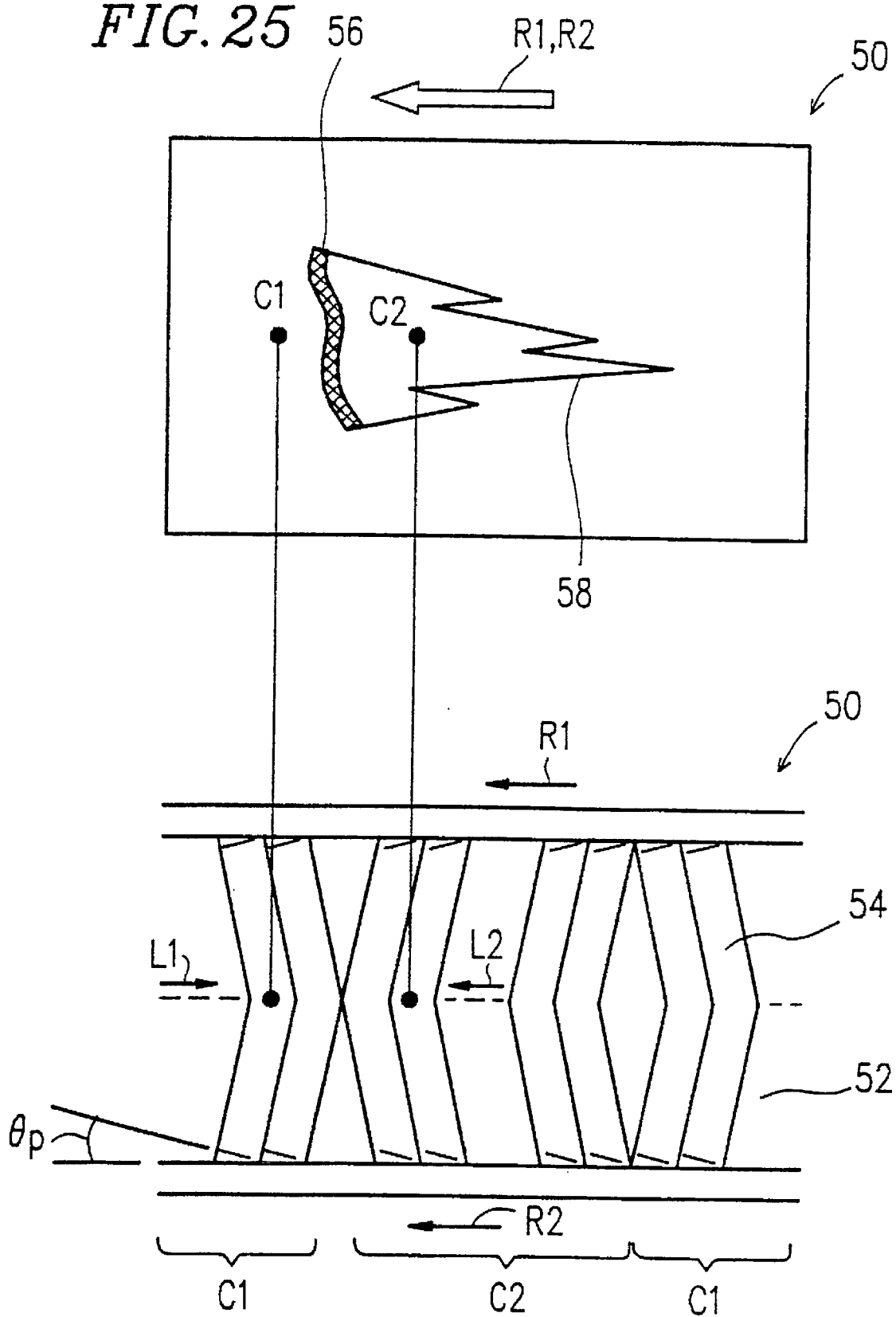
FIG. 25 is a diagram showing the C1 state and the C2 state of the smectic layer structure of FLC in a conventional FLCD.

The τ–V (pulse width-voltage) characteristics of FLCDs 23 and 24, which achieved the C2 state over the entire LC layer, were measured at 30° C. The values τ and V are defined as the pulse width and the pulse voltage, respectively, of a unipolar pulse required for switching the FLC material from one stable state to the other. Then, minimal pulse widths τmin and the corresponding pulse voltages Vmin were obtained, as shown in Table 14 and FIGS. 23 and 24.

TABLE 14

| FLCD | τ-V characteristic of FLCD at 30° C. | |
|---|---|---|
| | Vmin (V) | τmin (μsec) |
| FLCD23 | 59 | 20 |
| FLCD24 | 53 | 23 |

FLCDs 23 and 24, which achieved the C2 state over the entire LC layer, were driven at 30° C. with the driving waveform (C) shown in FIG. 9. The driving conditions and results are shown in Table 15. The driving memory angle cited in Table 15 is defined as an angle between the extinction positions due to two memory states when the FLCD is being driven.

TABLE 15

| | Driving characteristic of FLCD at 30° C. | | | | |
|---|---|---|---|---|---|
| FLCD | τ (μsec) | Vs (V) | Vd (V) | Line address time (μsec) | Driving memory angle (degree) |
| FLCD23 | 11 | 50 | 10 | 22 | 22.5 |
| FLCD24 | 11 | 46 | 10 | 22 | 18.5 |

Thus, according to the present invention, the area ratio of the C2 state regions to the entire LC layer achieves 100% because a FLC material whose tilt angle is 8° or less at (Tc−1)°C. is used. Accordingly, the FLCD according to the present invention has uniform electro-optical characteristic over the entire surface of the device. Therefore, a FLC display apparatus which is capable of uniform and high contrast display is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A ferroelectric liquid crystal device comprising: a pair of insulating substrates having alignment films and electrodes thereon; and a liquid crystal layer interposed between the pair of insulating substrates, the liquid crystal layer including a ferroelectric liquid crystal material being capable of exhibiting at least the smectic A phase and the chiral smectic C phase in its phase sequence, and the ferroelectric liquid crystal device being driven by switching an optic axis of the liquid crystal layer by selectively applying a driving voltage to at least one of the electrodes,
   wherein ferroelectric liquid crystal molecules of the liquid crystal layer have a tilt angle of 8° or less at a (Tc−1)°C. where Tc°C. is an uppermost temperature limit of the chiral smectic C phase of the ferroelectric liquid crystal material.

2. A ferroelectric liquid crystal device according to claim 1, wherein the liquid crystal layer has a bent smectic layer structure, and a uniaxial orientation treatment is conducted for the alignment films in a direction identical with a bend direction of the smectic layer structure.

3. A ferroelectric liquid crystal device according to claim 1, wherein ferroelectric liquid crystal molecules of the liquid crystal layer have two stable states for switching the optic axis of the liquid crystal layer, and a characteristic curve of pulse widths and pulse voltages required for rewriting the liquid crystal layer from one stable state to the other stable state has a pulse voltage which corresponds to a minimal value of the pulse width.

4. A ferroelectric liquid crystal device according to claim 2, wherein ferroelectric liquid crystal molecules of the liquid crystal layer have two stable states for switching the optic axis of the liquid crystal layer, and a characteristic curve of pulse widths and pulse voltages required for rewriting the liquid crystal layer from one stable state to the other stable state has a pulse voltage which corresponds to a minimal value of the pulse width.

5. A ferroelectric liquid crystal device according to claim 1, wherein the electrodes are a plurality of scanning electrodes and a plurality of signal electrodes which cross the plurality of scanning electrodes, and a plurality of pixels are defined by crossed regions of the plurality of scanning electrodes and the plurality of signal electrodes,
   wherein the ferroelectric liquid crystal device is driven by using voltages $V_1$, $V_2$, $V_3$, and $V_4$ which satisfy the relationships:

$$0 < V_2 < V_4;$$

and $$V_2 - V_1 < V_4 - V_3,$$

so that:
   A) when one of the plurality of pixels is selected, the ferroelectric liquid crystal molecules in a portion of the selected pixel are placed in one or the other stable state by applying a first pulse voltage $V_1$ followed by a second pulse voltage $V_2$ or applying a first pulse voltage $-V_1$ followed by a second pulse voltage $-V_2$ to the pixel; and B) the stable state of the ferroelectric liquid crystal molecules in the portion of the selected pixel is maintained by applying a first pulse voltage $V_3$ followed by a second pulse voltage $V_4$ or applying a first pulse voltage $-V_3$ followed by a second pulse voltage $-V_4$ to the pixel.

6. A ferroelectric liquid crystal device according to claim 2, wherein the electrodes are a plurality of scanning electrodes and a plurality of signal electrodes which cross the plurality of scanning electrodes, and a plurality of pixels are defined by crossed regions of the plurality of scanning electrodes and the plurality of signal electrodes, wherein the ferroelectric liquid crystal device is driven by using voltages $V_1$, $V_2$, $V_3$, and $V_4$ which satisfy the relationships:

$0 < V_2 < V_4$;

and $V_2 - V_1 < V_4 - V_3$, so that:
A) when one of the plurality of pixels is selected, the ferroelectric liquid crystal molecules in a portion of the selected pixel are placed in one or the other stable state by applying a first pulse voltage $V_1$ followed by a second pulse voltage $V_2$ or applying a first pulse voltage $-V_1$ followed by a second pulse voltage $-V_2$ to the pixel; and
B) the stable state of the ferroelectric liquid crystal molecules in the portion of the selected pixel is maintained by applying a first pulse voltage $V_3$ followed by a second pulse voltage $V_4$ or applying a first pulse voltage $-V_3$ followed by a second pulse voltage $-V_4$ to the pixel.

7. A ferroelectric liquid crystal device according to claim 3, wherein the electrodes are a plurality of scanning electrodes and a plurality of signal electrodes which cross the plurality of scanning electrodes, and a plurality of pixels are defined by crossed regions of the plurality of scanning electrodes and the plurality of signal electrodes, wherein the ferroelectric liquid crystal device is driven by using voltages $V_1$, $V_2$, $V_3$, and $V_4$ which satisfy the relationships:

$0 < V_2 < V_4$;

and $V_2 - V_1 < V_4 - V_3$, so that:
A) when one of the plurality of pixels is selected, the ferroelectric liquid crystal molecules in a portion of the selected pixel are placed in one or the other stable state by applying a first pulse voltage $V_1$ followed by a second pulse voltage $V_2$ or applying a first pulse voltage $-V_1$ followed by a second pulse voltage $-V_2$ to the pixel; and
B) the stable state of the ferroelectric liquid crystal molecules in the portion of the selected pixel is maintained by applying a first pulse voltage $V_3$ followed by a second pulse voltage $V_4$ or applying a first pulse voltage $-V_3$ followed by a second pulse voltage $-V_4$ to the pixel.

* * * * *